(12) United States Patent
Hashimoto et al.

(10) Patent No.: US 12,411,007 B2
(45) Date of Patent: Sep. 9, 2025

(54) MEASUREMENT DEVICE AND MEASUREMENT METHOD

(71) Applicant: Kioxia Corporation, Tokyo (JP)

(72) Inventors: Takaki Hashimoto, Kanagawa (JP); Hiroyuki Tanizaki, Aichi (JP)

(73) Assignee: KIOXIA CORPORATION, Tokyo (JP)

( * ) Notice: Subject to any disclaimer, the term of this patent is extended or adjusted under 35 U.S.C. 154(b) by 638 days.

(21) Appl. No.: 17/687,328

(22) Filed: Mar. 4, 2022

(65) Prior Publication Data

US 2023/0024986 A1 Jan. 26, 2023

(30) Foreign Application Priority Data

Jul. 14, 2021 (JP) .................. 2021-116674

(51) Int. Cl.
*G01B 15/04* (2006.01)
*G01N 23/02* (2006.01)
(Continued)

(52) U.S. Cl.
CPC ............. *G01B 15/04* (2013.01); *G01N 23/02* (2013.01); *G01N 23/201* (2013.01);
(Continued)

(58) Field of Classification Search
CPC ...... G01B 15/04; G01N 23/02; G01N 23/201; G01N 23/2055; G01N 2223/03;
(Continued)

(56) References Cited

U.S. PATENT DOCUMENTS

| 9,885,962 B2 | 2/2018 | Veldman et al. |
| 2014/0019097 A1 | 1/2014 | Bakeman et al. |

(Continued)

FOREIGN PATENT DOCUMENTS

| JP | 2015-531056 A | 10/2015 |
| JP | 2017-532602 A | 11/2017 |

(Continued)

*Primary Examiner* — Lee E Rodak
*Assistant Examiner* — Byung Ro Lee
(74) *Attorney, Agent, or Firm* — Foley & Lardner LLP

(57) ABSTRACT

A measurement device includes an analyzer configured to analyze a diffraction image of X-rays scattered from a subject; estimate a surface contour shape of a measurement area of the subject; extract feature data from shape information, and determine shape parameters for representing the surface contour shape; calculate a theoretical scattering intensity of each of the scattered X-rays when values of the shape parameters are changed; calculate a difference between a measured scattering intensity of each scattered X-ray and the corresponding theoretical scattering intensity, and generate a regression model of a relationship between a corresponding value of the shape parameter and the difference for each shape parameter; extract one shape parameter candidate value reducing the difference from the regression model, and calculate a theoretical scattering intensity of the shape parameter candidate value; and estimate the value of the shape parameter minimizing the difference while repeatedly changing the shape parameter candidate value.

19 Claims, 21 Drawing Sheets

(51) Int. Cl.
*G01N 23/201* (2018.01)
*G01N 23/2055* (2018.01)

(52) U.S. Cl.
CPC ..... *G01N 23/2055* (2013.01); *G01N 2223/03* (2013.01); *G01N 2223/054* (2013.01); *G01N 2223/0566* (2013.01); *G01N 2223/1016* (2013.01); *G01N 2223/305* (2013.01); *G01N 2223/6116* (2013.01)

(58) Field of Classification Search
CPC ..... G01N 2223/054; G01N 2223/0566; G01N 2223/1016; G01N 2223/305; G01N 2223/6116
See application file for complete search history.

(56) References Cited

U.S. PATENT DOCUMENTS

| | | | |
|---|---|---|---|
| 2014/0067316 A1* | 3/2014 | Ishibashi | G01N 23/207 378/86 |
| 2015/0260663 A1* | 9/2015 | Yun | H01J 35/08 378/36 |
| 2015/0300965 A1* | 10/2015 | Sezginer | G01N 23/207 378/86 |
| 2016/0117847 A1 | 4/2016 | Pandev et al. | |
| 2016/0282282 A1 | 9/2016 | Quintanilha et al. | |
| 2017/0061604 A1 | 3/2017 | Pandev | |
| 2017/0315055 A1* | 11/2017 | Tinnemans | G03F 9/7003 |
| 2018/0328868 A1 | 11/2018 | Bykanov et al. | |
| 2019/0049602 A1 | 2/2019 | Hench et al. | |
| 2019/0131193 A1* | 5/2019 | Yang | H01L 22/12 |
| 2020/0218844 A1 | 7/2020 | Feng et al. | |
| 2020/0333268 A1 | 10/2020 | Ito et al. | |

FOREIGN PATENT DOCUMENTS

| | | |
|---|---|---|
| JP | 2018-509609 A | 4/2018 |
| JP | 2018-534758 A | 11/2018 |
| JP | 2019-191605 A | 10/2019 |
| JP | 2020-520453 A | 7/2020 |
| JP | 2020-126254 A | 8/2020 |
| JP | 2020-176988 A | 10/2020 |

* cited by examiner

FIG. 4
DIFFRACTION IMAGE
(SAXS IMAGE)
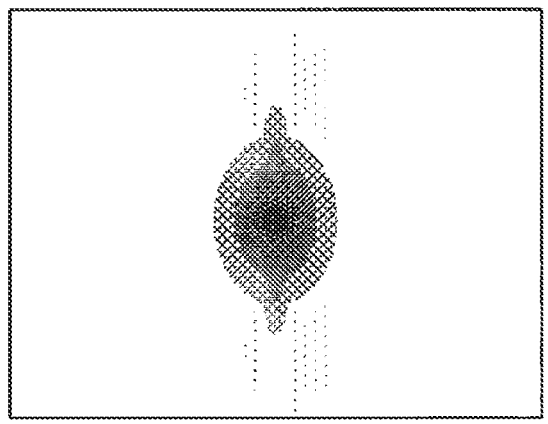
+1.0°
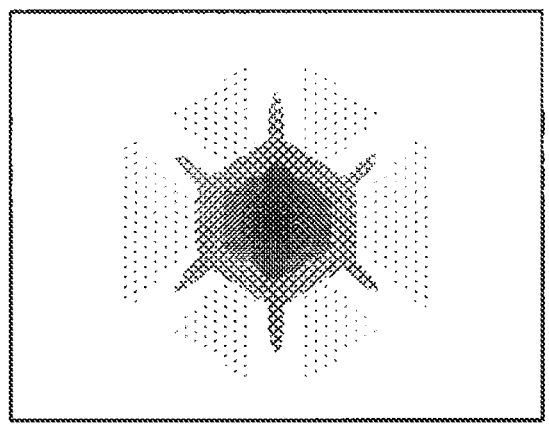
0.0°
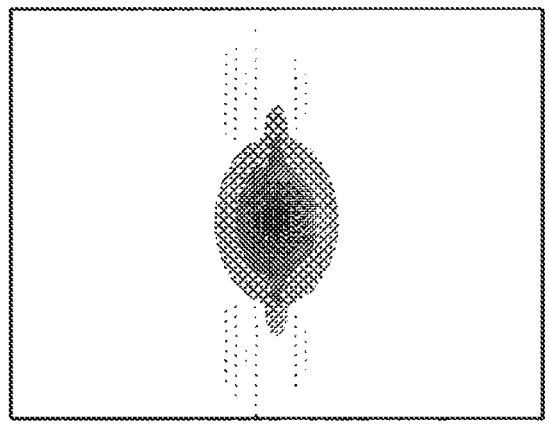
−1.0°

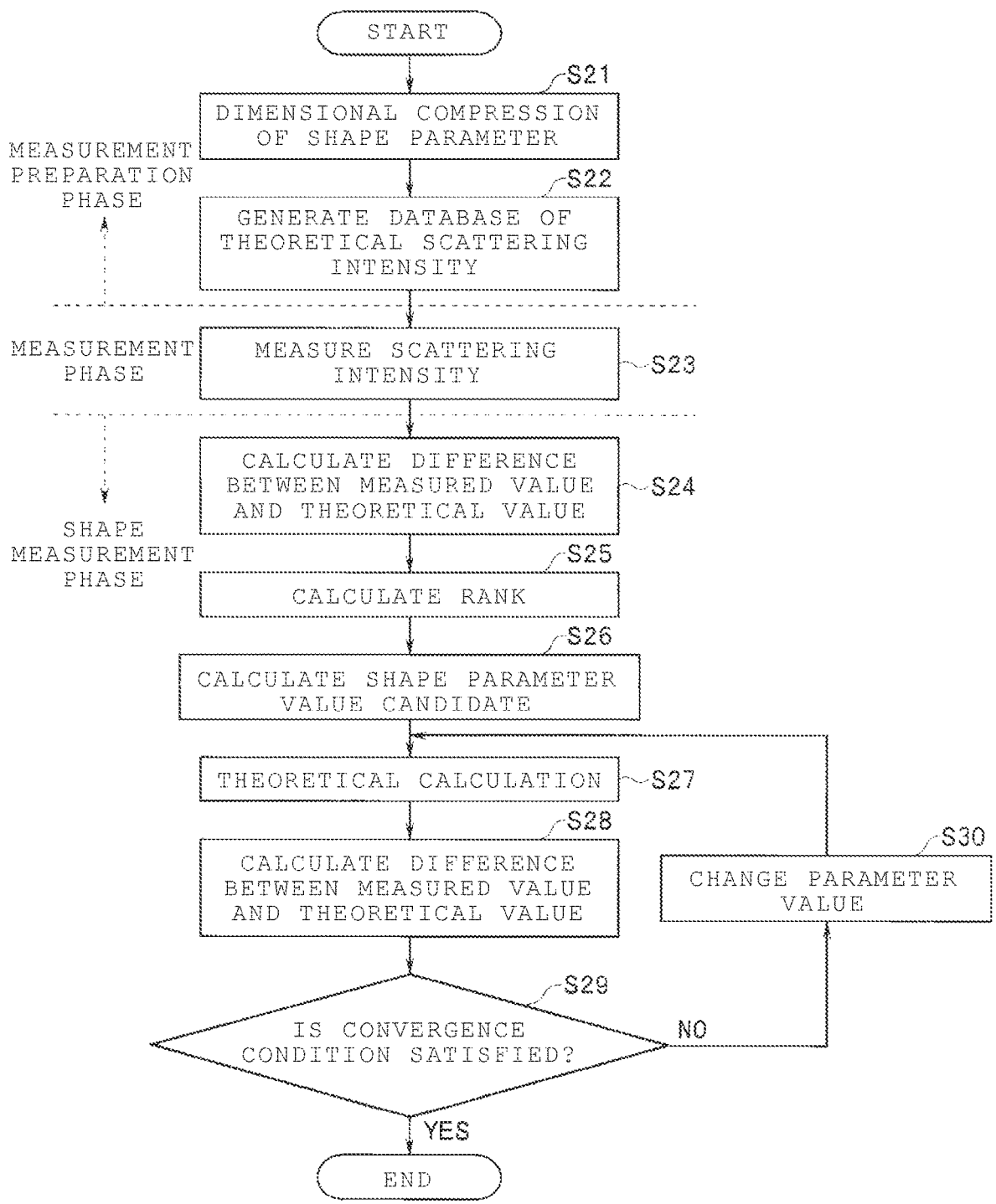

| | t1 | t2 | t3 | t4 | t5 | f1 |
|---|---|---|---|---|---|---|
| 1 | 0.542 | 0.125 | 0.282 | 0.409 | 0.542 | 0.679 |
| 2 | 0.387 | 0.793 | 0.669 | 0.617 | 0.15 | 0.742 |
| ... | ... | ... | ... | ... | ... | ... |

SHAPE PARAMETER: $t_i$     DIFFERENCE: f

| | t1 | t2 | t3 | t4 | t5 | f1 | f2 |
|---|---|---|---|---|---|---|---|
| 1 | 0.542 | 0.125 | 0.282 | 0.409 | 0.542 | 0.679 | 0.823 |
| 2 | 0.387 | 0.793 | 0.669 | 0.617 | 0.15 | 0.742 | 0.598 |
| ... | ... | ... | ... | ... | ... | ... | ... |

SHAPE PARAMETER: $t_i$     DIFFERENCE: $f_j$

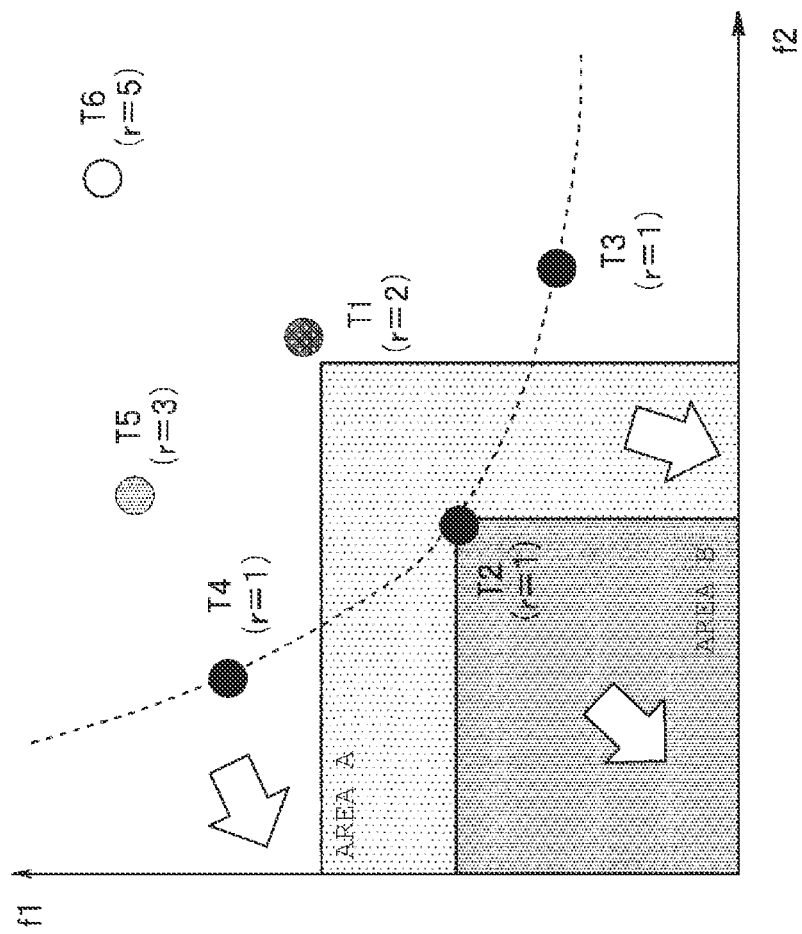

MEASUREMENT DEVICE AND MEASUREMENT METHOD

CROSS-REFERENCE TO RELATED APPLICATION

This application is based upon and claims the benefit of priority from Japanese Patent Application No. 2021-116674, filed Jul. 14, 2021, the entire contents of which are incorporated herein by reference.

FIELD

Embodiments described herein relate generally to a measurement device and a measurement method.

BACKGROUND

To measure a depth of a deep hole or a deep groove formed in a film formation portion on a semiconductor substrate and a three-dimensional shape of a side wall thereof, a transmission small angle X-ray scattering (hereinafter referred to as T-SAXS) technique is generally used.

DESCRIPTION OF THE DRAWINGS

FIG. 4 is a diagram illustrating a relationship between an incident angle of X-rays and a diffraction image.

FIG. 14B is a flowchart illustrating another example of the measurement method in the embodiment.

FIG. 26 is a diagram illustrating rank calculation.

DETAILED DESCRIPTION

Embodiments provide a measurement device and a measurement method capable of accurately modeling a three-dimensional shape of a deep hole having a complicated cross-sectional shape while reducing the number of parameters.

In general, according to one embodiment, a measurement device includes: an X-ray irradiator configured to irradiate a subject with X-rays; an X-ray detector configured to detect X-rays scattered from the subject; and an analyzer. The analyzer can analyze a diffraction image obtained by photoelectric conversion of the scattered X-rays; estimate a surface contour shape of a measurement area of the subject; extract feature data from shape information, and determine a plurality of shape parameters for representing the surface contour shape; calculate a respective theoretical scattering intensity of each of the scattered X-rays when values of the plurality of shape parameters are changed; calculate a difference between a measured scattering intensity of each of the scattered X-rays and the corresponding theoretical scattering intensity, and generate a regression model of a relationship between a corresponding ones of the values of the shape parameters and the difference for each shape parameter; extract at least one shape parameter candidate value that reduces the difference from the regression model, and calculate a theoretical scattering intensity of the shape parameter candidate value; and estimate the value of the shape parameter that minimizes the difference while repeatedly changing the shape parameter candidate value.

Hereinafter, embodiments will be described with reference to the drawings.

First Embodiment

A measurement device of an embodiment is, for example, a measurement device (a T-SAXS measurement device) that measures a three-dimensional shape of a deep hole having a complicated cross-sectional shape from an X-ray diffraction scattering intensity caused by transmission small angle X-ray scattering.

A T-SAXS measurement device 2 is a device that measures a three-dimensional shape of a periodic pattern formed on a surface of a subject by using transmitted X-rays. An average three-dimensional shape of a periodic pattern formed in a spot size (for example, about 50 to 1000 μm angle) can be measured by using a plurality of diffraction images (a SAXS image group) obtained by changing an incident angle of X-rays on a subject.

Figure 1:
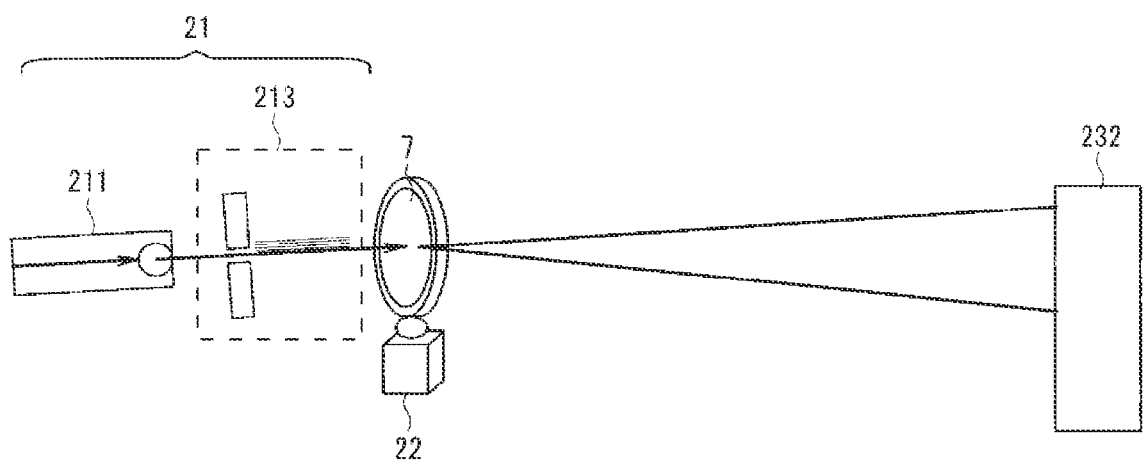
FIG. 1 is a schematic diagram illustrating an example of a configuration of a T-SAXS measurement device.
Figure 2:
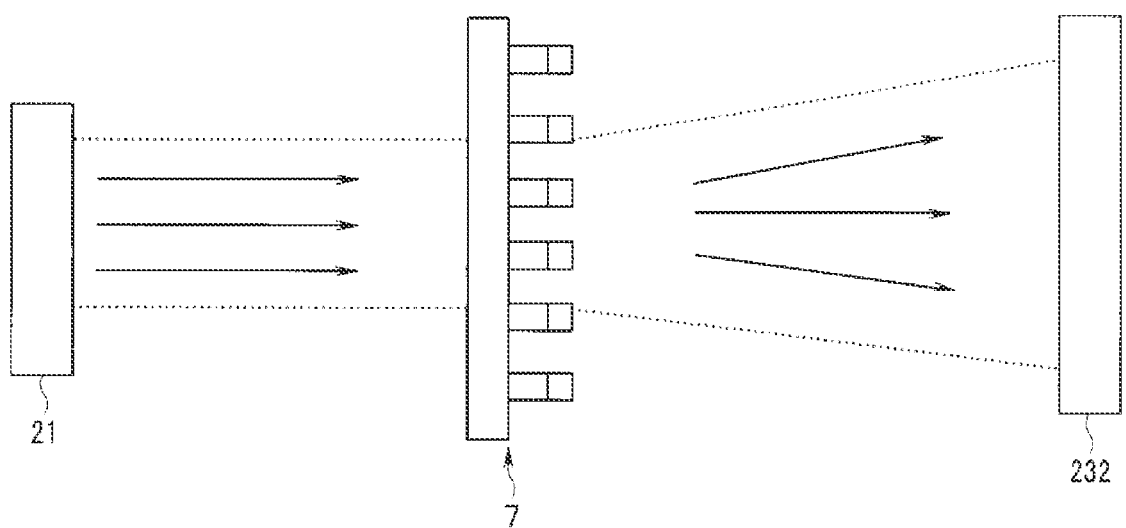
FIG. 2 is a schematic diagram illustrating an example of the configuration of the T-SAXS measurement device.
Figure 3:
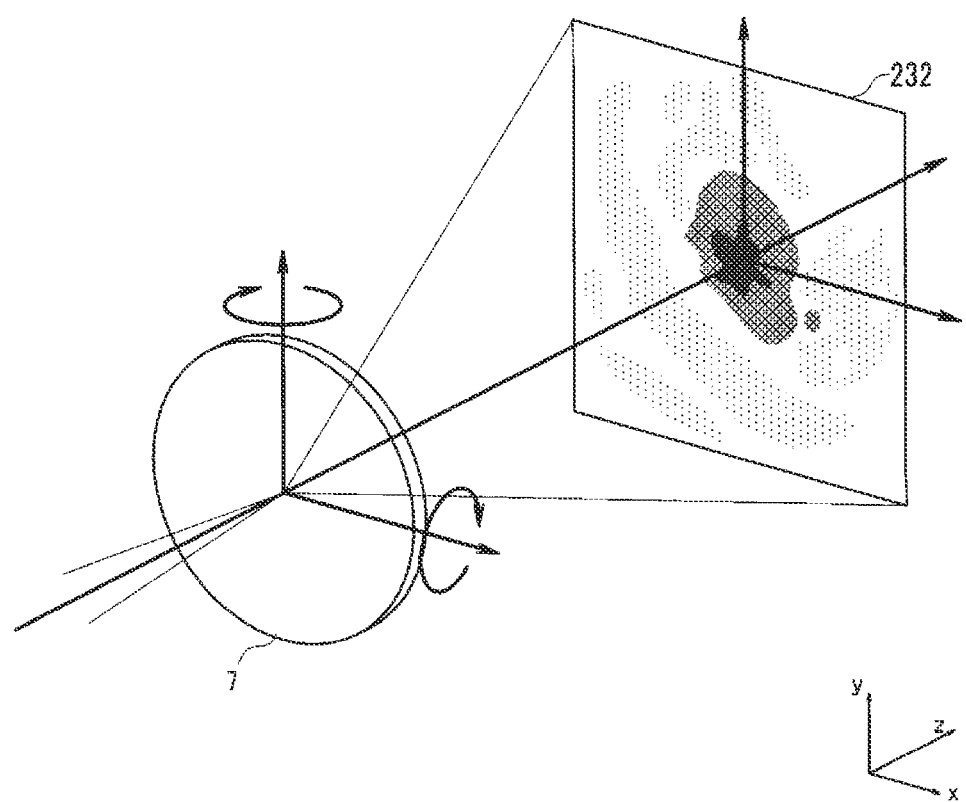
FIG. 3 is a schematic diagram illustrating an example of the configuration of the T-SAXS measurement device.

FIGS. 1 to 3 are schematic diagrams illustrating an example of a configuration of the T-SAXS measurement device. As illustrated in FIG. 1, the T-SAXS measurement device 2 causes a beam spot of X-rays emitted from an X-ray source 211 to converge by an X-ray convergence mechanism 213, and irradiates a surface of a subject 7 held on a measurement stage 22 (a semiconductor substrate having a periodic pattern such as a hole, a groove, or the like formed on a surface thereof) with the X-rays.

As illustrated in FIG. 2, the X-rays emitted to the subject 7 are scattered by a pattern formed on the surface of the subject 7. The scattered X-rays are converted into a signal (a diffraction image) indicating a feature of the subject 7 in a detector 232.

As illustrated in FIG. 3, the subject 7 is rotatably provided in a state where one or both of two directions (an x direction and a y direction) orthogonal to each other and parallel to the surface of the subject 7 is set as a rotation axis. The surface of the subject 7 refers to a surface of the semiconductor substrate forming the subject 7. The X-rays are emitted to the subject 7 in a state in which the subject 7 is rotated around the set rotation axis, thereby making it possible to adjust an incident angle θi of the X-rays with respect to the subject 7. The T-SAXS measurement device 2 acquires a plurality of diffraction images (a diffraction image group) while gradually changing the incident angle θi. FIG. 4 is a diagram illustrating a relationship between the incident angle of X-rays and the diffraction image. The acquired diffraction image group is compared with a plurality of diffraction image groups of which intensity distribution of X-ray diffracted light corresponding to various three-dimensional shape patterns is calculated by a simulation. A diffraction image group having a high degree of coincidence is extracted from the plurality of diffraction image groups, and a three-dimensional shape pattern corresponding to the extracted diffraction image group is estimated to be a pattern formed on the surface of the subject 7.

Figure 5:
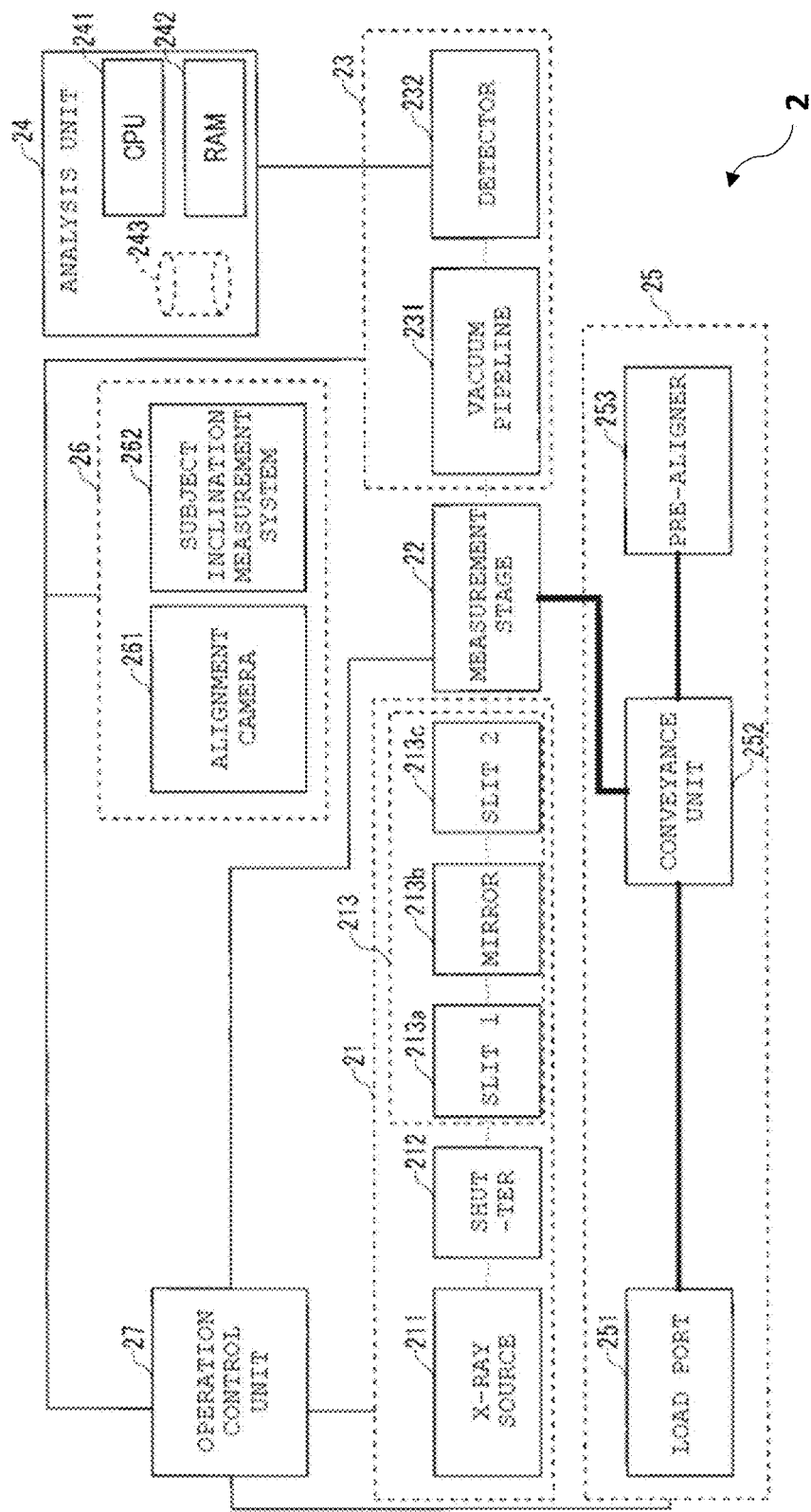
FIG. 5 is a block diagram illustrating an example of a configuration of a measurement device of an embodiment.

FIG. 5 is a schematic block diagram illustrating an example of a configuration of a measurement device of the embodiment. The measurement device of the embodiment, that is, the T-SAXS measurement device 2, includes an X-ray irradiation unit (or an X-ray irradiator) 21, the measurement stage 22, an X-ray detection unit (or an X-ray detector) 23, and an analysis unit (or an analyzer) 24. The T-SAXS measurement device 2 also includes a conveyance unit 25, a location measurement unit 26, and an operation control unit 27. In FIG. 5, a thick line indicates a conveyance path of the subject 7. A dotted line indicates an optical path of irradiation light and diffracted light. A solid line indicates a signal transmission path for transmitting data and information (an electrical signal).

The X-ray irradiation unit 21 is mainly formed of the X-ray source 211, a shutter 212, and the X-ray convergence mechanism 213. The X-ray source 211 is a portion that generates X-rays having a predetermined wavelength and energy. For example, the X-ray source 211 is configured as an electron beam source configured to excite X-rays by irradiating a solid or liquid target with particles. The shutter 212 is provided between the measurement stage 22 and the X-ray source 211. The shutter 212 can be opened and closed and is controlled by the operation control unit 27. When the shutter 212 is in an open state, the measurement stage 22 is irradiated with the X-rays emitted from the X-ray source 211. When the shutter 212 is in a closed state, an optical path of the X-rays is blocked, such that the measurement stage 22 is not irradiated with the X-rays.

The X-ray convergence mechanism 213 is mainly formed of a first slit 213a, a mirror 213b, and a second slit 213c. The X-ray convergence mechanism 213 is provided between the shutter 212 and the measurement stage 22. The first slit 213a is used to limit angular spread of the emitted X-rays. The mirror 213b causes the emitted X-rays to converge and reduces a beam size thereof. The second slit 213c is disposed close to the measurement stage 22 to further narrow down the beam size of the emitted X-rays. That is, the X-ray convergence mechanism 213 prevents scattered rays of the emitted X-rays from being emitted to the subject and to narrow down an irradiation range of the X-rays in the subject 7. The X-rays narrowed down by the X-ray convergence mechanism 213 are emitted to an imaging area of the subject 7 provided on the measurement stage 22.

The measurement stage 22 is a member that rotatably supports the subject 7 in the x direction and/or the y direction as a rotation axis. For example, the measurement stage 22 is formed of a support shaft formed of a cylindrical or rod-shaped member and a chuck which is a hollow ring-shaped member. The chuck is rotatably engaged with one end of the support shaft.

The measurement stage 22 is configured to be movable in the x direction and/or the y direction by a drive unit such as a motor which is not illustrated, and to be movable in a direction (a z direction) orthogonal to the x direction and the y direction. By moving the measurement stage 22 in the x direction and/or the y direction, an imaging area 7a, which is an area in which the subject 7 is irradiated with the X-rays, can be moved. By moving the measurement stage 22 in the z direction, a focus of the diffraction image of the subject 7 detected by the X-ray detection unit 23 can be changed. In a state where the subject 7 is held by the chuck, the support shaft and the measurement stage are configured to be operable by a drive unit such as a motor which is not illustrated, so that the center of rotation of the subject 7 coincides with an axis perpendicular to a wafer surface at a measurement portion.

The X-ray detection unit 23 is mainly formed of a vacuum pipeline 231 and the detector 232. The vacuum pipeline 231 is a columnar member whose inside is in a vacuum state, and is disposed between the measurement stage 22 and the detector 232. The diffracted X-rays generated from the subject 7 placed on the measurement stage 22 are incident from one end surface of the vacuum pipeline 231 into the vacuum pipeline 231, pass through the inside of the vacuum pipeline 231, and are emitted from the other end surface of the vacuum pipeline 231 toward the detector 232. The vacuum pipeline 231 prevents the diffracted X-rays from being affected by disturbance caused by an environment (air disturbance or the like) and noise from being superimposed on the diffraction image.

The detector 232 receives the diffracted X-rays generated from the subject 7 and generates the diffraction image. The detector 232 is formed of, for example, a plurality of semiconductor detection elements (solid-state imaging elements or the like) disposed in a two-dimensional array. As the semiconductor detection element, for example, a charge coupled device (CCD) and a CMOS image sensor are used. The diffracted X-rays generated by the emitted X-rays in the imaging area of the subject 7 are photoelectrically converted by the semiconductor detection element disposed in a projection area of the detector 232 and output as an imaging signal (the diffraction image).

The analysis unit 24 compares the diffraction image group output from the detector 232 (a plurality of diffraction images acquired by changing a rotation angle of the subject 7) and a diffraction image group calculated by simulating an intensity distribution of X-ray diffracted light corresponding to various three-dimensional shape patterns in advance. A diffraction image group having a high degree of coincidence is extracted from among the plurality of diffraction image groups, and a three-dimensional shape pattern corresponding to this diffraction image group is estimated to be a pattern formed on the surface of the subject 7. The analysis unit 24 includes a central processing unit (CPU) 241 and a memory (RAM) 242. An operation of estimating the three-dimensional shape pattern is performed by software, for example, by storing the software in the memory 242 as a program in advance and executing the software in the CPU. An operation of generating the three-dimensional shape pattern may be performed by one or more processors configured as hardware. For example, the processor may be a processor configured as an electronic circuit, or may be a processor configured with an integrated circuit such as a field programmable gate array (FPGA) or the like. The analysis unit 24 may include a database 243 for storing the diffraction image group calculated by simulating the intensity distribution of the X-ray diffracted light corresponding to various three-dimensional shape patterns.

The conveyance unit 25 includes a load port 251, a conveyance unit 252, and a pre-aligner 253. The load port 251 is an inlet unit provided for inserting the subject 7 into the T-SAXS measurement device 2. The conveyance unit 252 is a unit which automatically conveys the subject 7 to each unit in the T-SAXS measurement device 2. When the subject 7 is provided on the measurement stage 22, the pre-aligner 253 aligns a reference location provided on the subject 7 (for example, a notch, an orientation flat, or the like) with a desired location.

When the subject 7 is set on the measurement stage 22 of the T-SAXS measurement device 2, the conveyance unit 25 operates as follows. When a container containing the subject 7 is provided in the load port 251, the conveyance unit 252 picks up the subject 7 from the container and moves the subject 7 to the pre-aligner 253. After the pre-aligner 253 performs alignment of the subject 7 in the x direction and the y direction and alignment in a rotation direction with the center of the subject 7 as an axis in an xy plane, the conveyance unit 252 picks up the subject 7 again and installs the subject 7 on the measurement stage 22. When the acquisition of the diffraction image group is completed and the subject 7 is taken out from the T-SAXS measurement device 2, the conveyance unit 252 picks up the subject 7 from the measurement stage 22 and moves the subject 7 into the container provided in the load port 251. The operation of the conveyance unit 25 described above is controlled by the operation control unit 27.

The location measurement unit 26 includes an alignment camera 261 and a subject inclination measurement unit 262. The alignment camera 261 detects a deviation amount (a deviation amount in the xy plane) between an irradiation location on the measurement stage 22 of the X-rays emitted from the X-ray irradiation unit 21 and a measurement target location in the subject 7. The detected deviation amount is output to the operation control unit 27. The subject inclination measurement unit 262 measures an angle of a surface at a measurement location of the subject 7 provided on the measurement stage 22.

The operation control unit 27 controls an operation of each unit of the T-SAXS measurement device 2. For example, the operation control unit 27 instructs a parameter of the X-ray irradiation unit 21 and the X-ray detection unit 23, or instruct a rotation angle of the measurement stage 22 and a rotation direction thereof, or instruct an operation of the conveyance unit 25.

For example, the T-SAXS measurement device 2 of the embodiment described above is used in an etching step of forming a memory hole of a semiconductor storage device including a memory cell array having a three-dimensional structure. Here, the semiconductor storage device including the memory cell array having the three-dimensional structure will be described with reference to FIG. 6.

Figure 6:
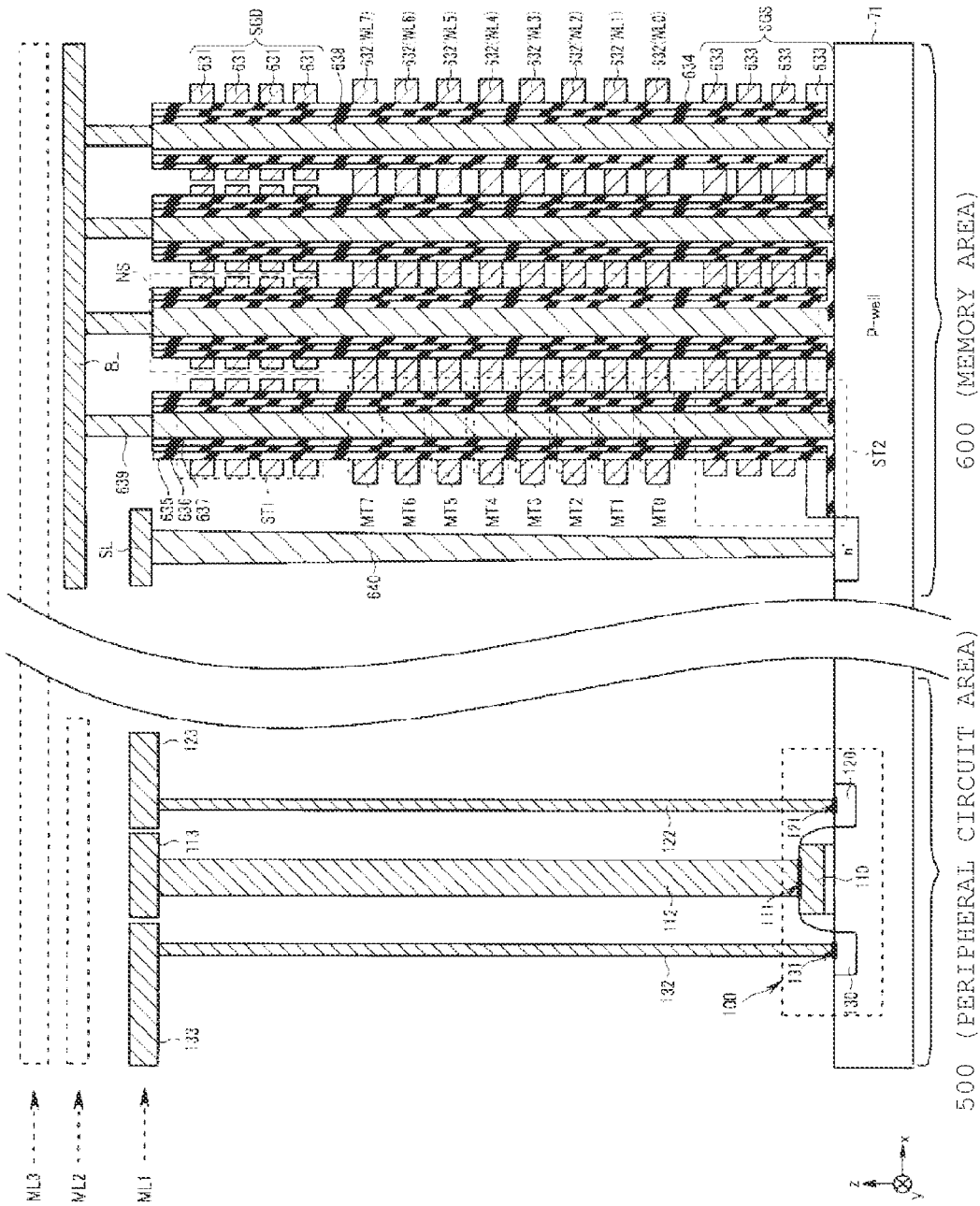
FIG. 6 is a cross-sectional view of a partial area of a semiconductor storage device including a memory cell array of a NAND memory having a three-dimensional structure.

FIG. 6 is a cross-sectional view of a partial area of a semiconductor storage device including a memory cell array of a NAND memory having a three-dimensional structure. For example, the semiconductor storage device functions as the subject 7. More specifically, for example, a semiconductor wafer for manufacturing the semiconductor storage device functions as the subject 7. FIG. 6 illustrates a partial area of a memory cell array and a peripheral circuit area. In the following description, a direction in which a bit line BL extends on a plane parallel to a surface of a semiconductor substrate 71 is defined as an x direction. A direction parallel to the surface of the semiconductor substrate 71 and orthogonal to the x direction is defined as a y direction. A direction orthogonal to the surface of the semiconductor substrate 71 is defined as a z direction. In the embodiment, a memory area 600 on which a memory circuit is formed is provided on the semiconductor substrate, and a peripheral circuit area 500 on which a peripheral circuit is formed is provided on the semiconductor substrate 71 around the memory area 600. That is, when viewed from the Z direction, the memory area 600 and the peripheral circuit area 500 are disposed so as not to overlap each other.

As illustrated in FIG. 6, a plurality of NAND strings NS are formed on a p-type well area (P-well). That is, a plurality of wiring layers 633 functioning as a select gate line SGS, a plurality of wiring layers 632 functioning as a word line WLi, and a plurality of wiring layers 631 functioning as a select gate line SGD are stacked on the p-type well area. FIG. 6 illustrates a structure in which eight wiring layers 632 functioning as the word line WLi are stacked, and in the memory cell array of the semiconductor storage device, the multi-layer wiring layers 632 such as 48 layers, 64 layers, and 96 layers may be stacked.

A memory hole 634 that penetrates these wiring layers 633, 632, and 631 and reaches the p-type well area is formed. A block insulating film 635, a charge storage film 636, and a gate insulating film 637 are sequentially formed on a side surface of the memory hole 634, and a conductor column 638 is further embedded in the memory hole 634. The conductor column 638 is formed of, for example, polysilicon, and functions as an area where a channel is formed during an operation of a memory cell transistor MT and select transistors ST1 and ST2 provided in a NAND string NS.

In each NAND string NS, the select transistor ST2, the plurality of memory cell transistors MT, and the select transistor ST1 are formed on the p-type well area. A wiring layer functioning as the bit line BL is formed above the conductor column 638. A contact plug 639 that connects the conductor column 638 and the bit line BL is formed at an upper end of the conductor column 638.

An n+ type impurity diffusion layer and a p+ type impurity diffusion layer are formed on a surface of the p-type well area. A contact plug 640 is formed on the n+ type impurity diffusion layer, and a wiring layer functioning as a source line SL is formed on the contact plug 640.

A plurality of the configurations illustrated in FIG. 6 are disposed in a depth direction (the y direction) of a paper surface of FIG. 6, and one string unit SU is formed by a set of a plurality of NAND strings disposed in a row in the depth direction.

On the other hand, in the peripheral circuit area 500, each circuit provided in the peripheral circuit such as an input and output circuit or the like is formed. For example, the above-described input and output circuit has a configuration in which logical gates such as an inverter or the like are combined with each other in multiple stages. Therefore, a large number of MOS transistors forming a logical gate are formed in the peripheral circuit area 500. A large number of these MOS transistors are formed on the semiconductor substrate 71 in the peripheral circuit area 500. FIG. 6 illustrates one of these MOS transistors. FIG. 6 schematically illustrates a cross-sectional structure of a non-volatile memory, and a size of a MOS transistor 100 illustrated in FIG. 6 and a ratio between elements forming the MOS transistor 100 are different from an actual size and ratio.

In the MOS transistor 100 forming the peripheral circuit, a gate wiring 110 is formed on the semiconductor substrate 71 via a gate insulating film. The gate wiring 110 is, for example, a polysilicon film into which an impurity suitable for an operation of the MOS transistor is injected. A drain area 120 and a source area 130 are formed on the semiconductor substrate on the right and left sides of the gate wiring 110 in the X direction. For example, when the MOS transistor 100 is an n-type MOS transistor (an NMOS transistor), impurities such as arsenic (As), phosphorus (P), or the like are injected into the semiconductor substrate 71 and diffused to a predetermined depth in the drain area 120 and the source area 130.

A metal wiring 113 for supplying voltage to the gate wiring 110 via an insulating layer is formed on an upper layer of the gate wiring 110. A gate electrode 111 as a contact area is formed on the gate wiring 110. A contact plug 112 for electrically connecting the metal wiring 113 and the gate electrode 111 is formed above the gate electrode 111. That is, the voltage of the metal wiring 113 is supplied from the gate electrode 111 to the gate wiring 110 via the contact plug 112.

A metal wiring 123 for supplying voltage to the drain area 120 via an insulating layer is formed on an upper layer of the drain area 120. A drain electrode 121 as a contact area is formed on the drain area 120. A contact plug 122 for electrically connecting the metal wiring 123 and the drain electrode 121 is formed above the drain electrode 121. That is, the voltage of the metal wiring 123 is supplied from the drain electrode 121 to the drain area 120 via the contact plug 122.

A metal wiring 133 for supplying voltage to the source area 130 via an insulating layer is formed on an upper layer of the source area 130. A source electrode 131 as a contact area is formed on the source area 130. A contact plug 132 for electrically connecting the metal wiring 133 and the source electrode 131 is formed above the source electrode 131. That is, the voltage of the metal wiring 133 is supplied from the source electrode 131 to the source area 130 via the contact plug 132.

A wiring layer formed of a metal material, such as the bit line BL, the source line SL, and the metal wirings 131 to 133, is formed on an upper layer of the NAND string NS after the NAND string NS is formed. Usually, the wiring layer formed of the metal material is formed in a plurality of layers with an insulating film interposed therebetween. The example of FIG. 6 illustrates a case where three wiring layers of ML1, ML2, and ML3 are provided. The bit line BL, the source line SL, and the metal wirings 131 to 133 are formed in one or more of these wiring layers. For example, FIG. 6 illustrates a case where the metal wirings 131 to 133 and the source line SL are formed in the wiring layer ML1 which is a first layer from the bottom, and the bit line BL is formed in the wiring layer ML2 which is a second layer from the bottom. For example, wiring or the like for transmitting a power supply voltage is formed on the uppermost wiring layer ML3.

Figure 7:
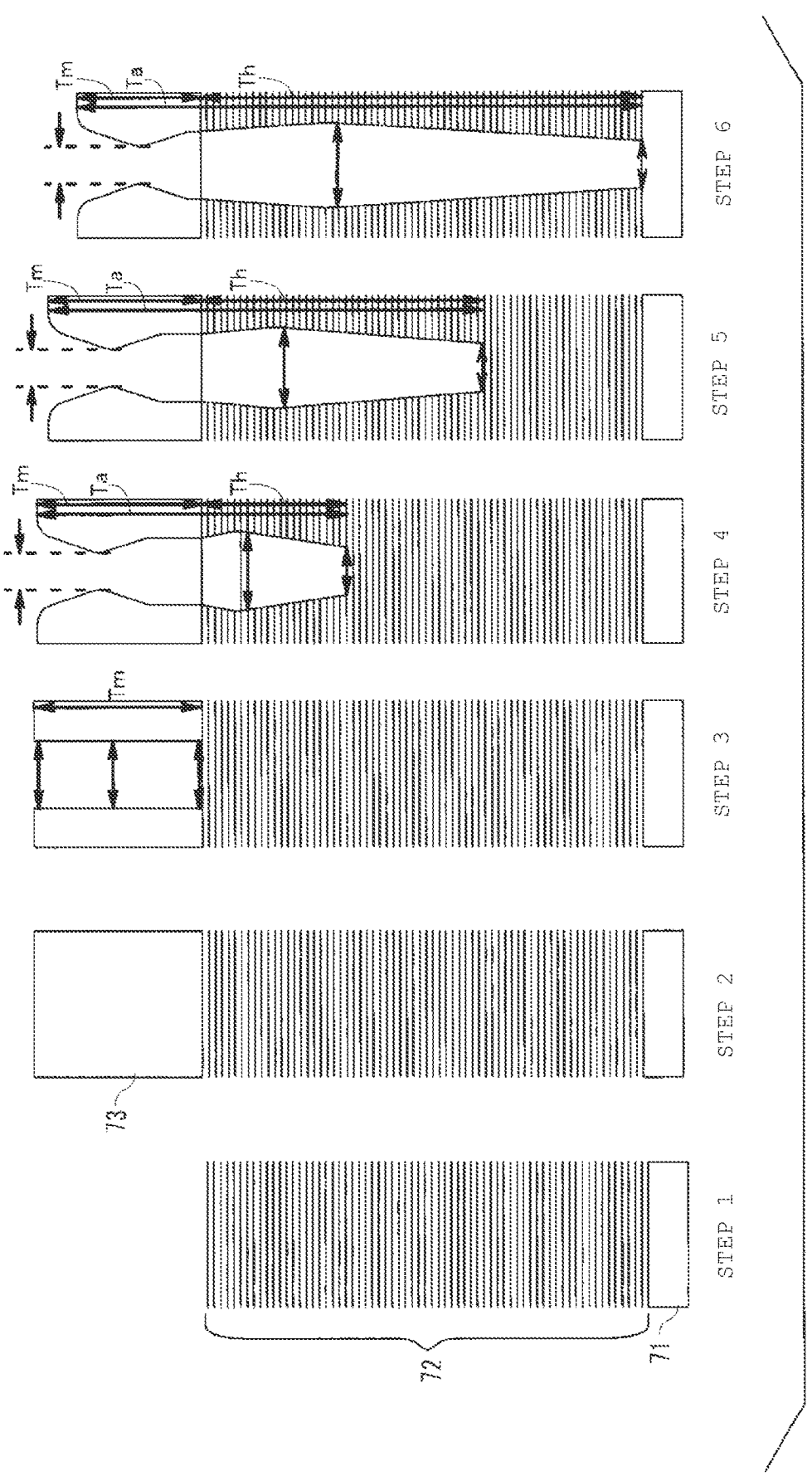
FIG. 7 is a schematic cross-sectional view illustrating a step of forming a memory hole.

Next, a method for forming the memory hole 634 in the semiconductor storage device having the structure illustrated in FIG. 6 will be described with reference to FIG. 7. FIG. 7 is a schematic cross-sectional view illustrating a step of forming a memory hole. The memory hole 634 is formed through, for example, a plurality of steps. FIG. 7 illustrates cross-sectional views of a plurality of steps for forming the memory hole 634 side by side from left to right in chronological order.

First, in a first step (step 1), a silicon oxide film and a silicon nitride film are alternately deposited on the semiconductor substrate 71, and an ON stacked film 72 is formed on the entire surface of the semiconductor substrate 71. In FIG. 7, a solid line corresponds to the silicon nitride film, and a blank adjacent to the solid line corresponds to the silicon oxide film. The silicon nitride film in the ON stacked film 72 is replaced with a conductive band film (for example, a tungsten film) in subsequent steps to form the wiring layer 631, the wiring layer 632, and the wiring layer 633. The silicon oxide film in the ON stacked film 72 serves as an insulating film between the above-described wiring layers.

In the subsequent step (step 2), an etching mask film 73 is deposited on a surface of the ON stacked film 72. As the etching mask film 73, for example, an amorphous carbon film or the like is used. Next, in the next step (step 3), the etching mask film 73 located in an area where the memory hole is formed is removed, and an opening is formed in the etching mask film 73.

In the following steps (steps 4 to 6), the ON stacked film 72 formed at a lower part of the opening of the etching mask film 73 is removed by dry etching using the etching mask film 73 as a mask. The memory hole 634 is, for example, a hole having a diameter of about 100 nm, a depth of several μm, and a high aspect ratio. Therefore, an optimum etching condition may change in the process of forming the memory hole 634. Therefore, in the process of forming the memory hole 634, the etching condition is changed in a plurality of steps. For example, at the end of each predetermined step, etching is temporarily interrupted, and a processing state of the hole (a residual film thickness of the etching mask film 73, an etching depth of the ON stacked film 72, a cross-sectional shape, or the like) is measured. Next, the etching condition is adjusted depending on the measured processing state, and the next stage of etching is performed. In FIG. 7, a cross section at the end of a certain stage is illustrated in step 4, and a cross section at the end of a stage after step 4 is illustrated in step 5. In the etching for forming the memory hole, more "steps" for measuring the processing state and adjusting the etching condition may be determined. Each time each stage is completed, the processing state is measured, and the measured processing state is fed back to the adjustment of the etching condition in the next stage. The etching condition of the next stage may not change depending on a measurement result of the processing state.

In FIG. 7, a cross section at the end of a stage after step 5 is illustrated in step 6. In step 6, all the ON stacked films 72 formed at the lower part of the opening of the etching mask film 73 are removed, and formation of the memory hole is completed. In FIG. 7, the residual film thickness of the etching mask film 73 is shown as Tm, the etching depth of the ON stacked film 72 is shown as Th, and a depth from a surface of the etching mask film 73 to a bottom of the processed hole is shown as Ta. That is, there is a relationship of Tm+Th=Ta.

Figure 8:
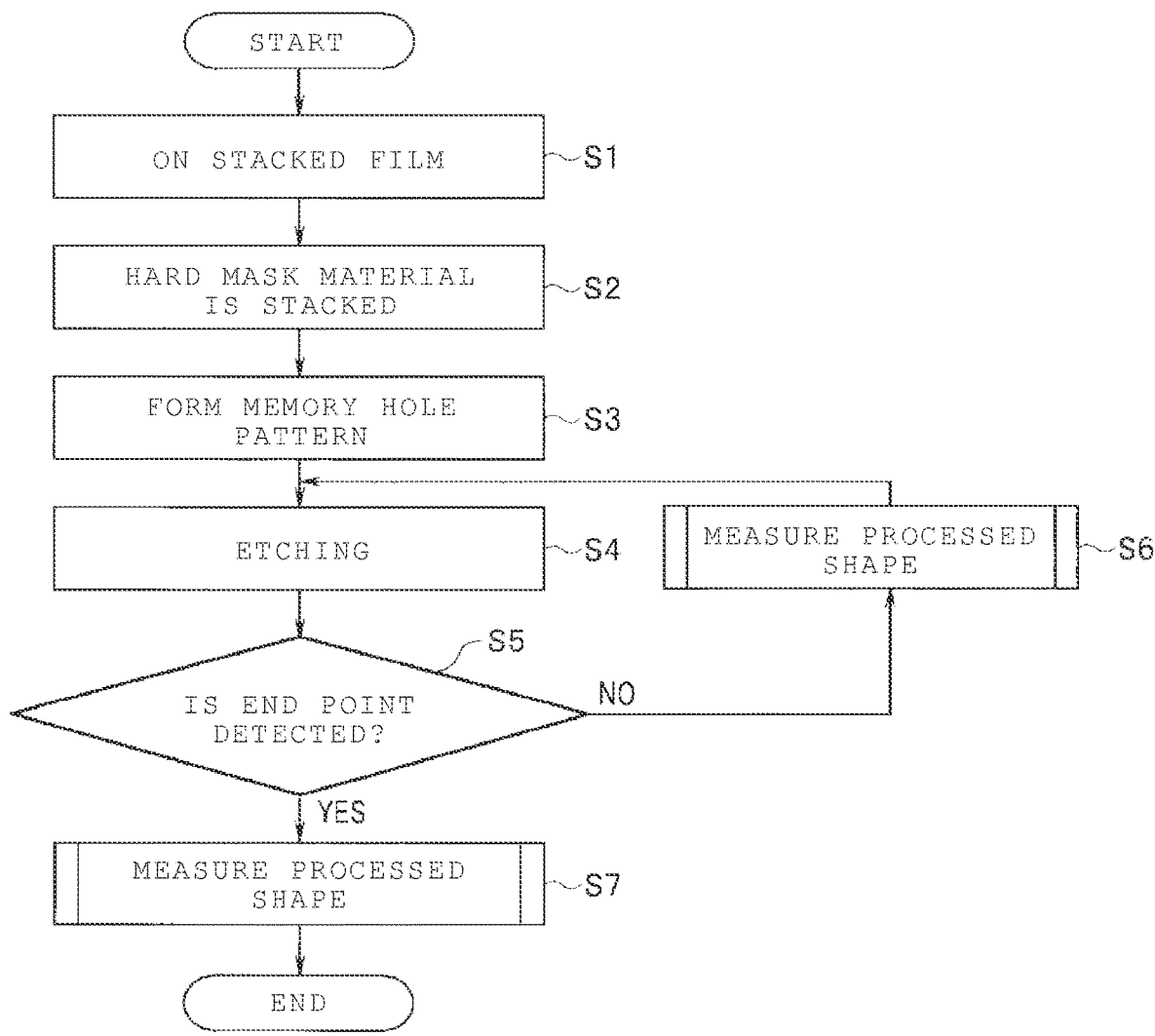
FIG. 8 is a flowchart illustrating an example of a procedure of forming the memory hole.

The measurement device of the embodiment may be applied to measurement of a three-dimensional shape of the memory hole 634 at the time when each of the above-described steps is completed. FIG. 8 is a flowchart illustrating an example of a procedure of forming the memory hole.

First, a silicon oxide film and a silicon nitride film are alternately deposited on the semiconductor substrate 71, and the ON stacked film 72 is formed (S1). Next, amorphous carbon as a hard mask material is deposited on a surface of the ON stacked film 72, and the etching mask film 73 is formed (S2). Next, the etching mask film 73 in an area where a memory hole is formed is removed, and an opening (a memory hole pattern) is formed in the etching mask film 73 (S3).

Next, dry etching (anisotropic etching) of the ON stacked film 72 is performed (S4). As described above, since a film thickness of the ON stacked film 72 is large and a diameter of the memory hole is small, a hole having a high aspect ratio is required to be formed. Therefore, the etching is performed in a plurality of stages. During the etching, detection (end point detection) of whether the semiconductor substrate 71 is exposed at the bottom of the opening is performed in order to determine the end of etching (S5). When the semiconductor substrate 71 is detected (S5, YES), it is considered that the hole formed by the etching penetrates the ON stacked film 72, and the etching is stopped. Next, a processed shape of the hole is measured by the measurement device of the embodiment (S7), and the formation of the memory hole is completed.

On the other hand, when the semiconductor substrate 71 is not detected in the end point detection at the time when the first stage etching is completed (S5, NO), the etching is temporarily stopped, and the processed shape of the hole is measured by the measurement device of the embodiment (S6). Based on a measurement result in S6, a parameter of the etching in the next stage is adjusted as necessary. Next, returning to S4, the etching of the next stage of the ON stacked film 72 is performed. A series of procedures from S4 to S6 is repeatedly executed until the end point is detected in S5.

Figure 9:
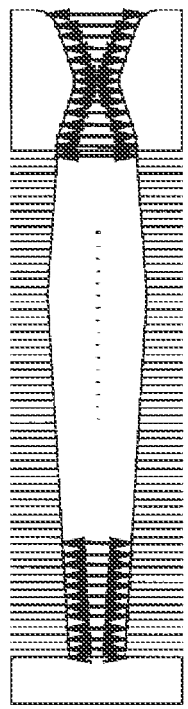
FIG. 9 is a diagram illustrating a shape parameter in a comparative example.
Figure 10:
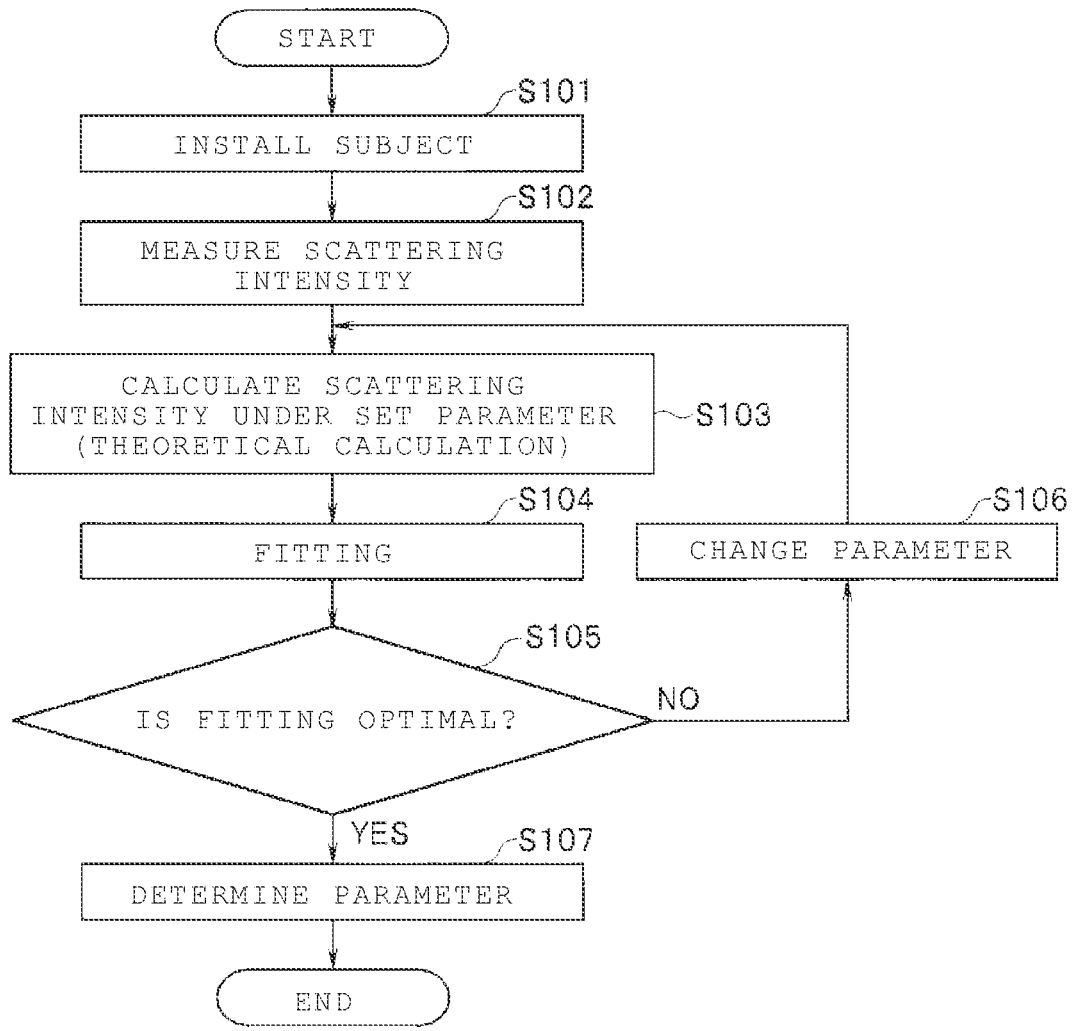
FIG. 10 is a flowchart illustrating an example of a measurement method in the comparative example.
Figure 11:
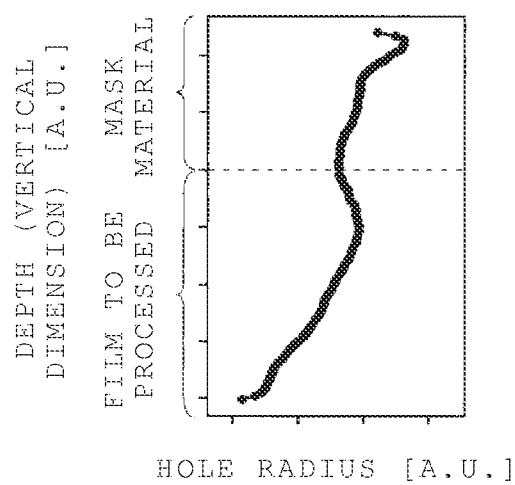
FIG. 11 is a diagram illustrating an example of a measurement result in the comparative example.

Next, a method for measuring a deep hole having a complicated cross-sectional shape such as the above-described processed hole of the memory hole or the like will be described. Prior to the measurement method of the embodiment, a measurement method of a comparative example will be described. FIG. 9 is a diagram illustrating a shape parameter in the comparative example. FIG. 10 is a flowchart illustrating an example of the measurement method in the comparative example. FIG. 11 is a diagram illustrating an example of a measurement result in the comparative example.

In the comparative example illustrated in FIG. 9, a processed hole to be measured is finely sliced in a depth direction, and a fluctuation in diameter and location is added as a shape parameter at each depth. For example, when the processed hole is divided into 25 equal layers in the depth direction and four parameters including a diameter parameter (Dx, Dy) and a location deviation amount parameter (Δx, Δy) are provided at each depth, in total, it is required to set the shape parameters of 25×4=100. In the case of a complicated shape such as a memory hole, when it is required to represent the complicated shape by finely slicing the complicated shape in the depth direction, the number of shape parameters increases more than the shape parameters of 25×4=100. The shape parameter in the comparative example may be referred to as a grid parameter.

In the comparative example, an optimum solution for each shape parameter is calculated by using the procedure illustrated in FIG. 10. That is, a subject is provided in the measurement device (S101), a scattering intensity is measured, and a diffraction image group is acquired (S102). On the other hand, under a specific condition such as a specific shape model or a slice layer condition, an initial value is added to the shape parameter to theoretically calculate the diffraction image group (S103). A theoretical value calculated in S103 is fitted to a measured value acquired in S102 (S104), and when the fitting is not optimal (S104, NO), a value of the shape parameter is changed (S106), and the process returns to the theoretical calculation in S103. When the fitting is optimal (S104, YES), the value used in the theoretical calculation at that time is used as the value of the shape parameter. That is, in the comparative example, the shape of the processed hole is measured by analyzing the diffraction image group by the shape parameter fitting using the theoretical calculation. By finely slicing the shape in the depth direction and representing the shape, a smooth cross-sectional shape can be obtained as illustrated in FIG. 11.

Figure 12:
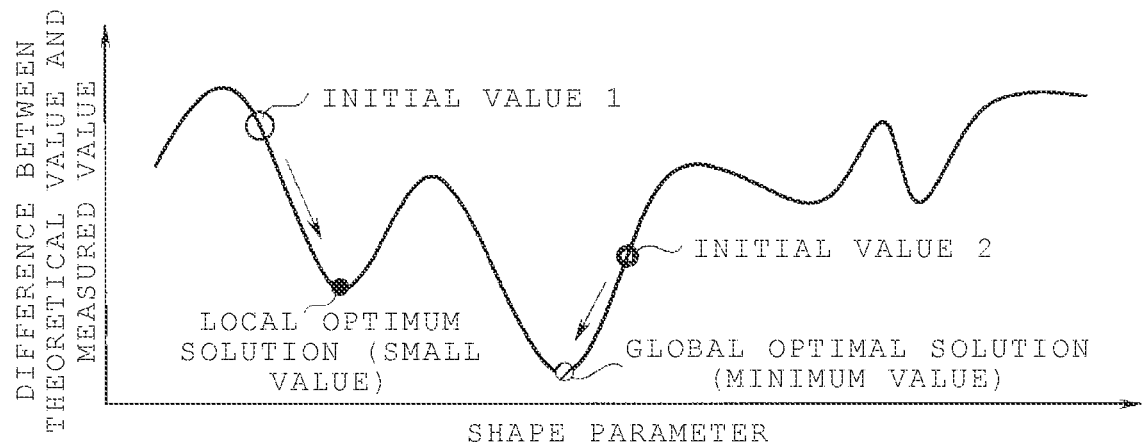
FIG. 12 is a diagram illustrating a relationship between a difference between a theoretical value and a measured value and a value of the shape parameter.
Figure 13:
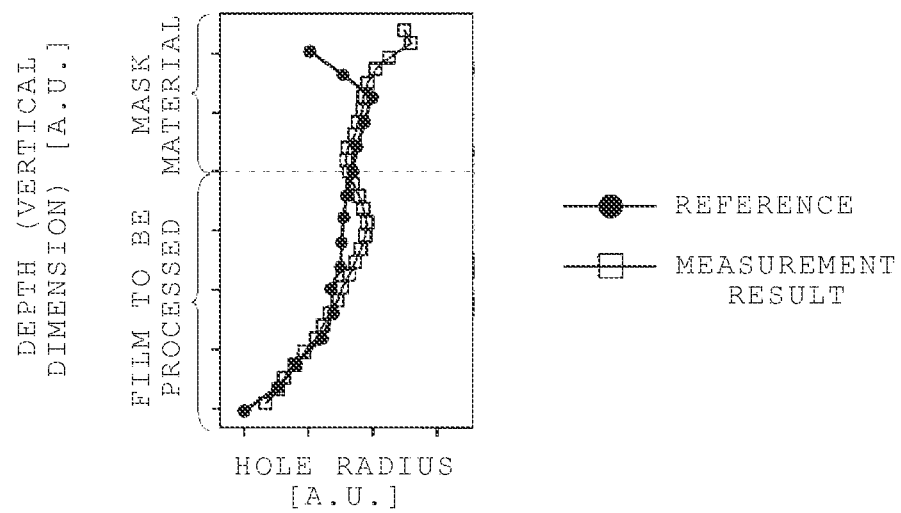
FIG. 13 is a diagram illustrating a difference between the measurement result and a shape of a processed hole in the comparative example.

However, in the comparative example, when the initial value added when the diffraction image group is theoretically calculated is not appropriate, a local optimum solution may be used as the value of the shape parameter. FIG. 12 is a diagram illustrating a relationship between a difference between the theoretical value and the measured value and the value of the shape parameter. As illustrated in FIG. 12, the difference between the theoretical value and the measured value varies depending on the value of the shape parameter. For example, when a value (an initial value 2) shown by a double circle in FIG. 12 is added as the initial value and a numerical search is started for a certain shape parameter, a value (a minimum value, a global optimum solution) shown by a diagonal circle in FIG. 12 is calculated as the value of the shape parameter. However, when a value shown by a white circle in FIG. 12 (an initial value 1) is added as the initial value and the numerical search is started, according to the method of the comparative example, a value (a small value, a local optimum solution) shown by a black circle in FIG. 12 is calculated as the value of the shape parameter. That is, according to the method of the comparative example, depending on the way the initial value is added, it may not be possible to calculate the value (the minimum value, the global optimum solution) where the difference between the theoretical value and the measured value is the smallest as the value of the shape parameter. As the number of shape parameters increases, the number of shape parameters for which non-optimal values are calculated increases. Therefore, as illustrated in FIG. 13, in the comparative example, there is a possibility that a measurement result deviates from an actual shape of the processed hole (reference in FIG. 13) such that accuracy of the analysis deteriorates. FIG. 13 is a diagram illustrating a difference between the measurement result and the shape of the processed hole in the comparative example.

Figure 14A:
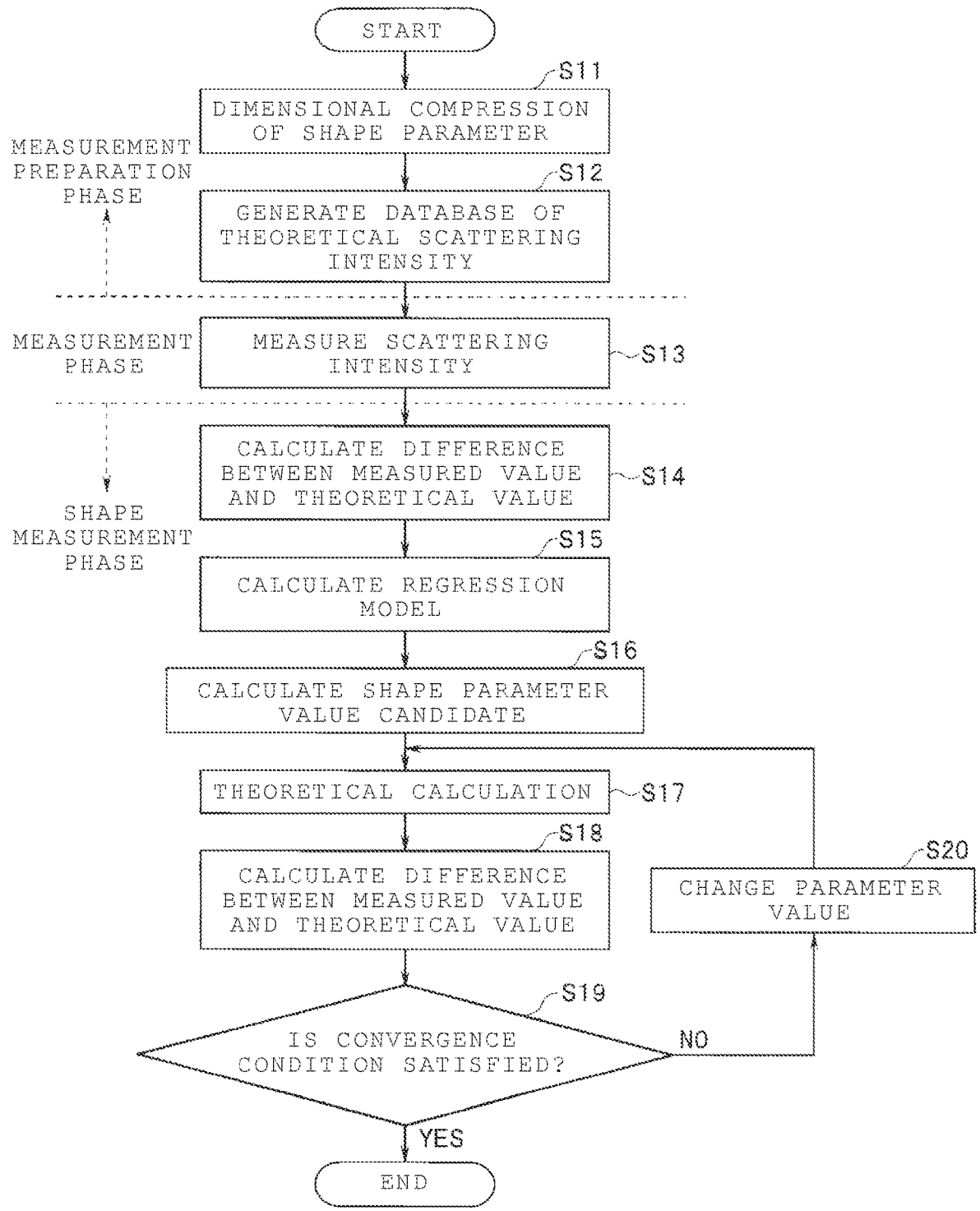
FIG. 14A is a flowchart illustrating an example of a measurement method in an embodiment.

Next, the measurement method of the embodiment will be described with reference to FIG. 14A. FIG. 14A is a flowchart illustrating an example of the measurement method in the embodiment. That is, a series of procedures shown in FIG. 14A may be applied to the measurement of the processed shape in S6 and S7 of FIG. 8. Hereinafter, the measurement method in the embodiment will be described by taking the processed hole shown in step 6 of FIG. 7 as an example.

The measurement method of the embodiment is formed of three phases. A first phase is a procedure (S11 and S12) performed before measuring an X-ray diffraction scattering intensity of a processed hole to be measured. A second phase is a procedure (S13) of measuring the X-ray diffraction scattering intensity of the processed hole. A third phase is a procedure (S14 to S20) performed after measuring the X-ray diffraction scattering intensity of the processed hole. Hereinafter, the first phase is referred to as a measurement preparation phase, the second phase is referred to as a measurement phase, and the third phase is referred to as a shape measurement phase.

Figure 15:
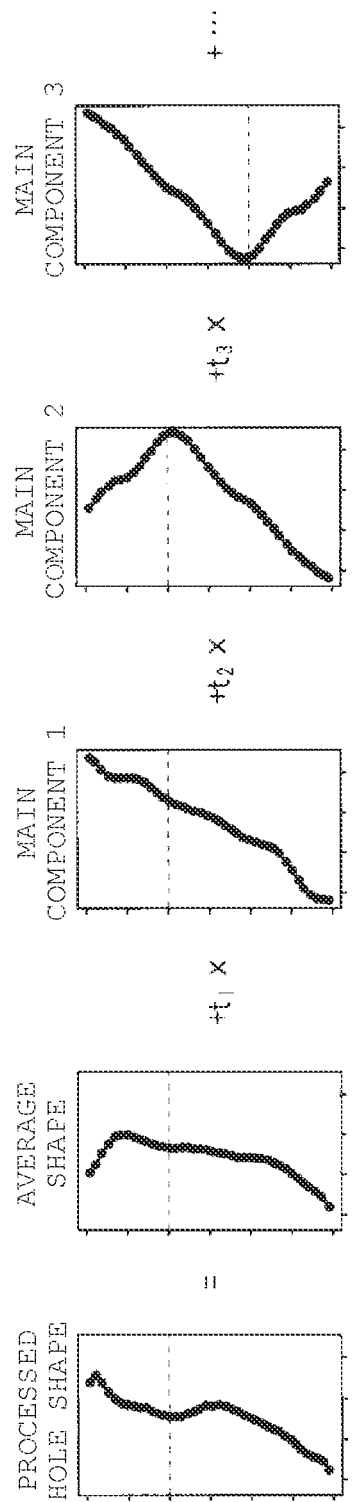
FIG. 15 is a diagram illustrating main component analysis.

First, the measurement preparation phase will be described. As illustrated in FIG. 14A, the measurement preparation phase is formed of two procedures including dimensional compression of the shape parameter (S11) and database generation of the theoretical scattering intensity (S12). In the dimensional compression of the shape parameter (S11), the number of shape parameters is reduced by extracting feature data from known shape information. As a specific method of the dimensional compression, for example, main component analysis can be used. FIG. 15 is a diagram illustrating the main component analysis. First, the feature data is extracted from known shapes of a plurality of processed holes by the main component analysis, and then a main component decomposition is performed. A main component 1, a main component 2, a main component 3, ..., a main component n illustrated in FIG. 15 correspond to the extracted feature data. The shape of the processed hole is represented by synthesizing these feature data at a predetermined ratio. At this time, a degree of contribution of the main component 1, the main component 2, the main component 3, ..., the main component n to the processed hole shape is set to t1, t2, t3, ..., tn. A specific shape can be represented by substituting a specific value for t1, t2, t3, ..., tn. That is, n pieces of variables of t1, t2, t3, ..., tn become the shape parameters in the measurement method of the embodiment. In the embodiment, for example, the shape parameters are decomposed to about 5 to 7 main components. As a result, the number of shape parameters can be reduced as compared with the comparative example.

The method for extracting the feature data from the known shape is not limited to the above-described main component analysis. For example, other dimensional compression methods such as independent component analysis, singular value analysis, eigenvalue analysis, factor analysis, non-negative matrix factor analysis, neural network, auto encoder, variational auto encoder, uniform manifold approximation and projection (UMAP), or the like may be used.

In the database generation of the theoretical scattering intensity (S12), the theoretical scattering intensity when at least one set of shape parameters is changed is calculated, and the theoretical scattering intensity database is generated. In other words, various shape patterns are assumed by changing the shape parameter, and an intensity distribution of X-ray diffracted light corresponding to these shape patterns is calculated by a simulation and stored in a database. For example, by changing the shape parameter, M pieces of (for example, 1000 pieces of) different shape patterns are set, and the intensity distribution of the X-ray diffracted light is calculated by a simulation for each shape pattern. That is, the diffraction image group is theoretically calculated for each of the M pieces of shape patterns and stored in the database.

Next, the measurement phase will be described. As illustrated in FIG. 14A, the measurement phase is a procedure (S13) of measuring the diffraction scattering intensity of the processed hole. In S13, the X-rays are incident on the processed hole while the incident angle is changed little by little, thereby acquiring a plurality of diffraction images (the diffraction image group).

Figures 16A, 16B, 17:
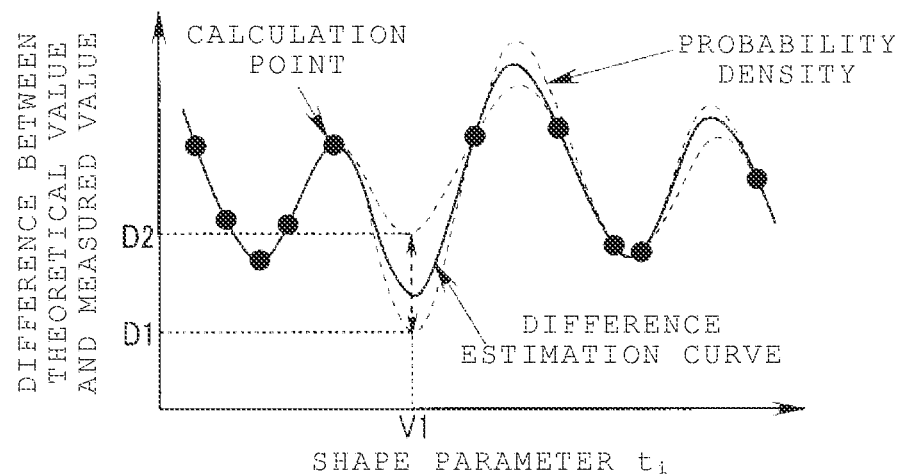
FIG. 16A is a diagram illustrating an example of a difference calculation result between a measured value and a theoretical value.
FIG. 16B is a diagram illustrating an example of the difference calculation result between the measured value and the theoretical value.
FIG. 17 is a diagram illustrating a regression model that estimates a difference from the value of the shape parameter.

Next, the shape measurement phase will be described. In difference calculation (S14) between the measured value and the database theoretical value, the diffraction image group (the measured value) acquired in S13 is compared with the diffraction image group (the theoretical value) stored in the database generated in S12, and a difference therebetween is calculated. FIGS. 16A and 16B are diagrams illustrating an example of a difference calculation result between the measured value and the theoretical value. In a table of FIG. 16A, a leftmost column indicates an identification number of the shape pattern stored in the database. Second to sixth columns from the left indicate the value of the shape parameter in each shape pattern. A rightmost column indicates a difference between the theoretical scattering intensity of the shape pattern and the measured scattering intensity. As a specific difference calculation method, an index representing each data element of the diffraction scattering intensity (for example, a pixel) is set to i, the diffraction scattering intensity of each data element of the diffraction image group of the measured value is set to $I_{exp,\,i}$, the diffraction scattering intensity of each data element of the diffraction image group of the theoretical value is set to $I_{cal,\,i}$, and a weighting coefficient of each data element is set to $w_{j,\,i}$, thereby performing calculation by $f_j$ of the following Equation (1).

$$f_j = \sum_{i=1}^{N} w_{j,i}(I_{exp,i} - I_{cal,i})^2 \qquad \text{Equation (1)}$$

In Equation (1), N is the total number of diffraction scattering intensity data, j is a weighting coefficient, and $w_{j,\,i}$ is a data set, and a plurality of data sets may be taken depending on which of the data elements is emphasized. Therefore, a plurality of values representing the difference $f_j$ may be obtained according to j. FIG. 16A is an example of a difference result when the difference is one type, and FIG. 16B is an example of a difference result when the difference is two types. In S14, the difference from the measured value is calculated for all the shape patterns registered in the database.

Next, in calculation of a regression model (S15), a regression model that estimates a difference from the value of the shape parameter is calculated based on the difference calculated in S14. Specifically, for each shape parameter, a relationship between the value of the shape parameter and a difference between the theoretical scattering intensity and the measured value is extracted. Next, a regression model that estimates the difference between the theoretical scattering intensity and the measured value with respect to the value of the shape parameter is generated. FIG. 17 is a diagram illustrating a regression model that estimates the difference from the value of the shape parameter when the difference is one type of f1 as illustrated in FIG. 16A. A horizontal axis of FIG. 17 is the value of the shape parameter, and a vertical axis is the difference between the theoretical scattering intensity and the measured value. First, from the difference calculated in S14, the relationship between the value of the shape parameter and the difference is extracted for each shape parameter. For example, for the shape parameter t1, M pieces of data are extracted, such as (the value of the shape parameter, the difference)=(0.542, 0.679), (0.387, 0.742), or the like. For each shape parameter, the regression model that estimates the difference from the shape parameter is calculated by using the extracted M pieces of data. As the regression model, for example, Gaussian process regression is used. For example, as illustrated in FIG. 17, the regression model calculated in S15 calculates a curve (a difference estimation curve) that passes through a calculation point corresponding to the extracted data and passes through a point (an estimated value) having the highest existence probability in an area where the calculation point does not exist. At this time, in the area where the calculation point does not exist, an area having the probability that the difference exists (a probability density area) is also calculated. That is, the estimated value is a value existing in the probability density area and is an undetermined value. For example, in FIG. 17, when the value of the shape parameter is V1, a corresponding calculated value does not exist. According to the estimated regression model, when the value of the shape parameter is V1, it is estimated that the difference between the theoretical value and the measured value exists between D1 and D2. The regression models are respectively generated for all the set shape parameters. That is, n pieces of regression models are generated.

The regression model used in S15 is not limited to the Gaussian process regression described above. For example, other regression models such as neural network, main component regression, multiple regression, Lasso regression, Ridge regression, a convolutional neural network, Bayesian regression, PLS regression, or the like may be used.

Figure 18:
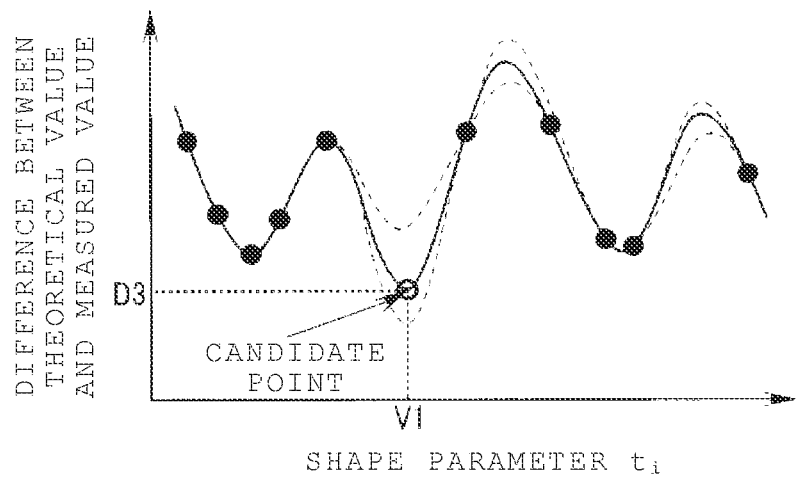
FIG. 18 is a diagram illustrating a shape parameter value candidate.

When the calculation of the regression model is completed and the difference estimation curve is acquired, the process proceeds to S16, and calculation of a shape parameter value candidate is performed. Specifically, in the difference estimation curve, a value of the shape parameter in which the difference is estimated to be small is calculated. FIG. 18 is a diagram illustrating the shape parameter value candidate. In the case of the difference estimation curve illustrated in FIG. 18, when the value of the shape parameter is V1, the probability that the difference becomes the minimum value is high, and the difference at this time is estimated to be D3. Therefore, in the shape parameter, the shape parameter value candidate is V1. The calculation of the shape parameter value candidate is performed for all the set shape parameters. That is, the shape parameter value candidates are respectively calculated for n pieces of shape parameters. In the difference estimation curve, when there are a plurality of other small points having a possibility that the difference may be the minimum value, a plurality of parameter value candidates are also calculated. A parameter value candidate set is generated by combining the parameter value candidates calculated for each of the shape parameters. For example, when n=5, that is, the number of shape parameters is 5, and when 0.766 and 0.312 are calculated as candidates for a parameter t1, 0.678 is calculated as a candidate for a parameter t2, 0.560 is calculated as a candidate for a parameter t3, 0.808 is calculated as a candidate for a parameter t4, and 0.815 is calculated as a candidate for a parameter t5, two sets of parameter value candidate sets of (t1, t2, t3, t4, t5)=(0.766, 0.678, 0.560, 0.808, 0.815) (0.312, 0.678, 0.560, 0.808, 0.815) are generated. The parameter value candidate set generated in S16 may be generated by selecting a parameter value that is estimated to have a small difference from the difference result between the measured value and the theoretical value for all the shape patterns registered in the database calculated in S14.

Figure 19:
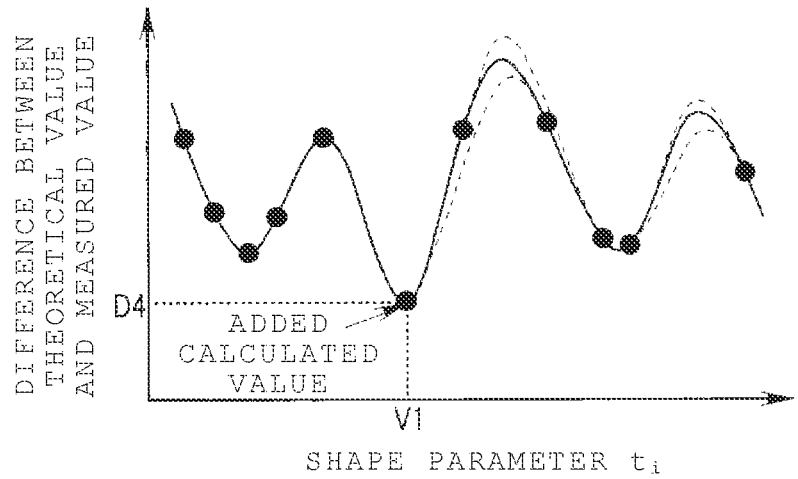
FIG. 19 is a diagram illustrating an example of an updated regression model.

Next, the scattering intensity of X-rays is theoretically calculated for the shape represented by the shape parameter value candidate set calculated in S16, and a diffraction image group is acquired (S17). The theoretical value calculated in S17 is compared with the measured value acquired in S13, and a difference therebetween is calculated (S18). The calculated difference is used to add the calculation point in the difference estimation curve, and the regression model is updated. FIG. 19 is a diagram illustrating an example of the updated regression model. When the difference between the measured value and the theoretical value is calculated to be D4 in V1 which is the shape parameter value candidate, (V1, D4) is added to the regression model as a newly calculated value. Next, the regression model is updated together with the calculation point already set. In the updated regression model, it can be seen that as illustrated in FIG. 19, the probability density area is reduced, and an uncertain area is reduced such that the accuracy of the difference estimation curve is improved.

It is determined whether the shape parameter value candidate is a value that minimizes the difference according to a predetermined convergence condition (S19). When the convergence condition is not satisfied (S19, NO), the value of the shape parameter candidate is changed by using an optimization algorithm for obtaining the minimum value (S20). As the optimization algorithm for obtaining the minimum value, for example, Bayesian optimization may be used. S17 to S20 are repeatedly performed while the value of the shape parameter candidate is changed. When the predetermined convergence condition is satisfied (S19, YES), the value of the shape parameter candidate at that time is determined as the value of the shape parameter. A shape to be represented by using a determined value of n pieces of shape parameters is defined as the shape of the processed hole, and a series of procedures related to the measurement method of the embodiment is completed.

The optimization algorithm for obtaining the minimum value is not limited to the Bayesian optimization described above. For example, other numerical optimization methods such as a genetic algorithm method, a simulated annealing method, a gradient method, a simplex method, a differential evolution method, a multipurpose genetic algorithm, a multipurpose simulated annealing method, or the like may be used.

As described above, according to the measurement device and the measurement method of the embodiment, the number of shape parameters representing the shape of the deep hole to be measured can be reduced. By using a small number of shape parameters and analyzing a shape using the regression model such as Gaussian process regression and the global optimization method such as Bayesian optimization, an influence of the initial value added at the time of analysis on an analysis result can be reduced, and the global optimum solution, that is, the value of the parameter that minimizes the difference between the measured value and the theoretical value can be obtained. Accordingly, the shape to be measured can be modeled with high accuracy.

Second Embodiment

Next, a second embodiment will be described. In a measurement method of the second embodiment, the method of dimensional compression of the shape parameter is different from that of the first embodiment described above. Since the configuration of the measurement device and the structure of the subject 7 to be measured are the same as those of the first embodiment described above, the description thereof will be omitted. Hereinafter, only a point different from that of the first embodiment will be described.

Figure 20:
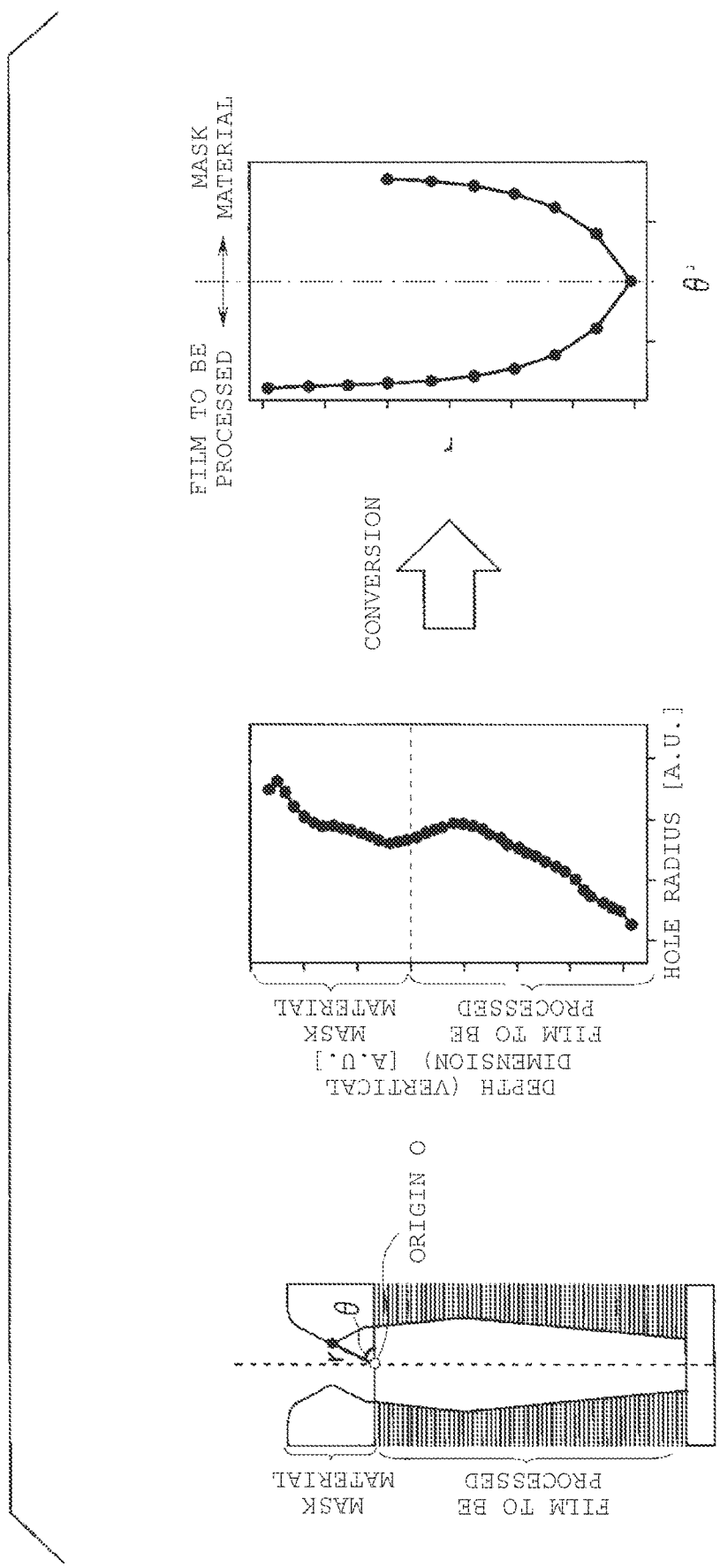
FIGS. 20A-C are a diagram illustrating a shape representation in a second embodiment.

In the first embodiment described above, the feature data is extracted from the known shape, the main components are decomposed, and the specific value is estimated for the degree of contribution of each main component to the processed shape (the shape parameter), thereby representing the shape of the processed hole. On the other hand, in the second embodiment, the shape of the processed hole is represented by a distance r from a set origin and an angle θ with respect to the xy plane passing through the origin by using polar coordinate conversion. FIGS. 20A-C are a diagram illustrating a shape representation in the second embodiment. In particular, FIG. 20A is a diagram illustrating a method for representing the shape of the processed hole in the second embodiment; FIG. 20B is a diagram illustrating a shape representation of a processed hole according to a comparative example; and FIG. 20C is a diagram illustrating the processed hole having the shape illustrated in FIG. 20B by the method of the second embodiment.

As illustrated in FIG. 20A, for example, the center of a processed hole at an interface between the mask material (the etching mask film 73) and the film to be processed (the ON stacked film 72) is set as an origin O, and any location P (a location where measurement is performed) on a surface of the processed hole is subjected to the polar coordinate conversion by using a distance r from the origin O and an angle θ of a line segment OP with respect to the interface between the mask material and the film to be processed. The angle θ is cubed and converted into a θ^3–r plane. By cubing the angle θ, a curve obtained by the conversion becomes smooth. The order of powering the angle θ may be an odd number, and may be a higher power such as 5th power or 7th power.

In this manner, when the shape of the processed hole is further converted into the θ^3–r plane after the polar coordinate conversion and is represented, complexity of the processed shape is reduced. For example, the shape of the processed hole having a complicated uneven shape as illustrated in FIG. 20B can be represented with a downwardly convex parabola in which the origin is an apex, as illustrated in FIG. 20C.

Figure 21:
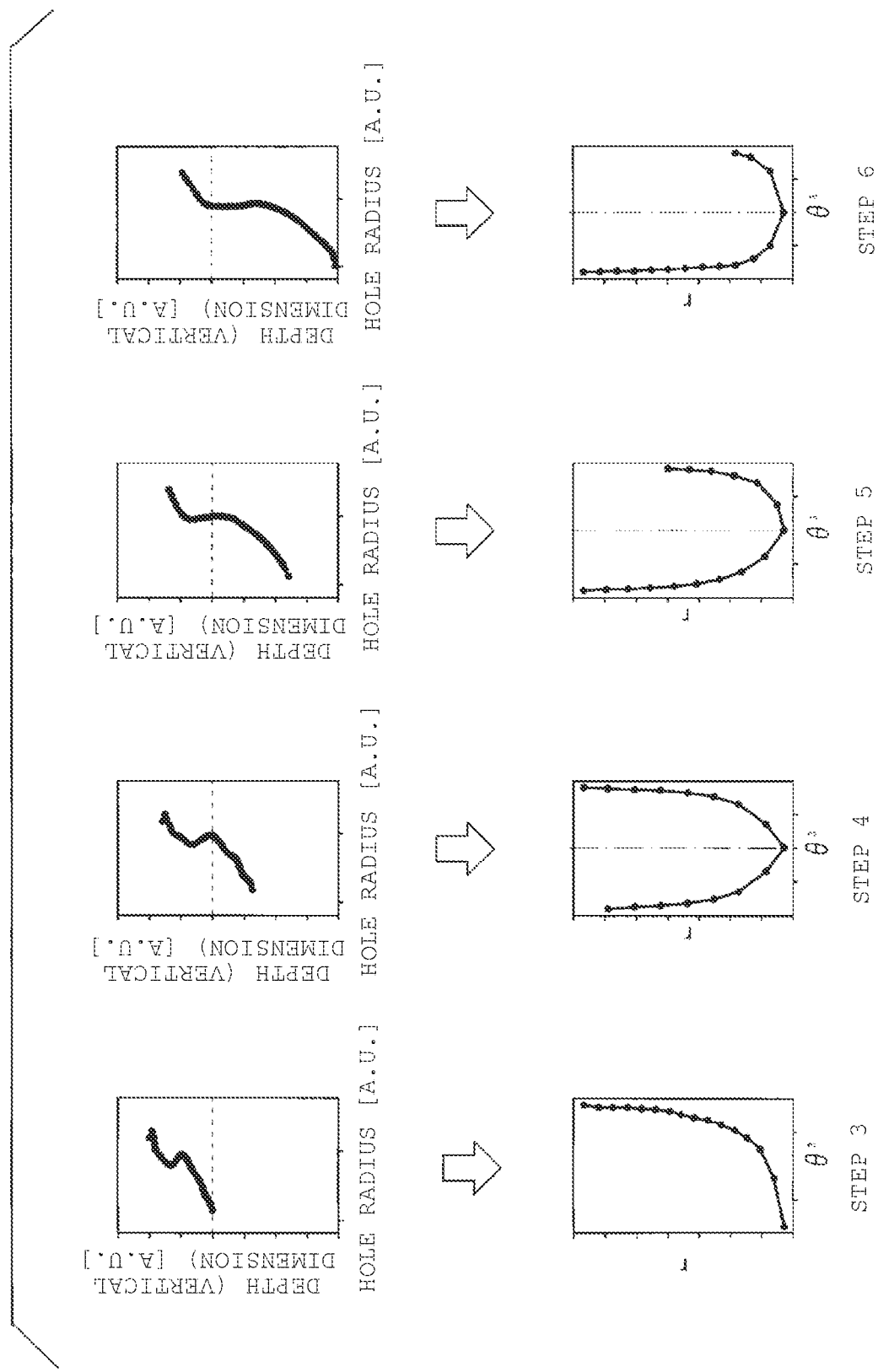
FIG. 21 is a diagram in which shape representations of processed holes before and after conversion to a polar coordinate system are compared with each other.

FIG. 21 is a diagram in which shape representations of processed holes before and after conversion to a polar coordinate system are compared with each other. As an example, FIG. 21 illustrates four processed holes corresponding to step 3, step 4, step 5, and step 6 of FIG. 7. Four drawings illustrated in an upper part of FIG. 21 represent a shape of a processed hole with a representation method according to the comparative example. In the four drawings illustrated in the upper part thereof, a dotted line indicates a location of the interface between the mask material and the film to be processed. The four drawings illustrated in a lower part thereof represent a representation method in the embodiment, that is, the shape of the processed hole is represented by converting the shape thereof into the polar coordinates and then further converting the shape thereof into the θ^3–r plane. In the four drawings illustrated in the lower part thereof, an alternate long and short dash line indicates a location of the interface between the mask material and the film to be processed. The two drawings illustrated above and below in the same column represent the same processed holes, and the processed holes corresponding to step 3, step 4, step 5, and step 6 are represented in order from left to right.

As illustrated in FIG. 21, in the representation method according to the comparative example, the curve changes as the process progresses, and the location and number of uneven shapes change in a complicated manner. On the other hand, in the representation method according to the embodiment, in any step, the shape is represented with a downwardly convex smooth parabola in which the origin (the interface between the mask material and the film to be processed) as an apex. That is, the shape of the processed hole can be represented by estimating an end point of the curve on the θ^3–r plane. An end point on the right side of the curve on the θ^3–r plane is estimated from a residual film thickness of the mask material. An end point on the left side is estimated from a depth of the processed hole (the memory hole) formed in the film to be processed. As described above, in the second embodiment, the shape of the processed hole can be represented by using two shape parameters including a residual film thickness Tm of the mask material and a depth of the memory hole (=an etching depth Th of the ON stacked film 72).

The measurement method of the embodiment is different from that of the first embodiment in that in S11 of FIG. 14A (the dimensional compression of the shape parameter), the above-described two variables (the residual film thickness Tm of the mask material, the depth Th of the memory hole) are used as the shape parameters. In S14 of FIG. 14A, the shape parameter candidate (a range of values that can be acquired as the shape parameter) is estimated and the set of the theoretical values for performing the difference calculation with the measured value is limited to an estimated range, which is also a point different from that of the first embodiment.

Figure 22:
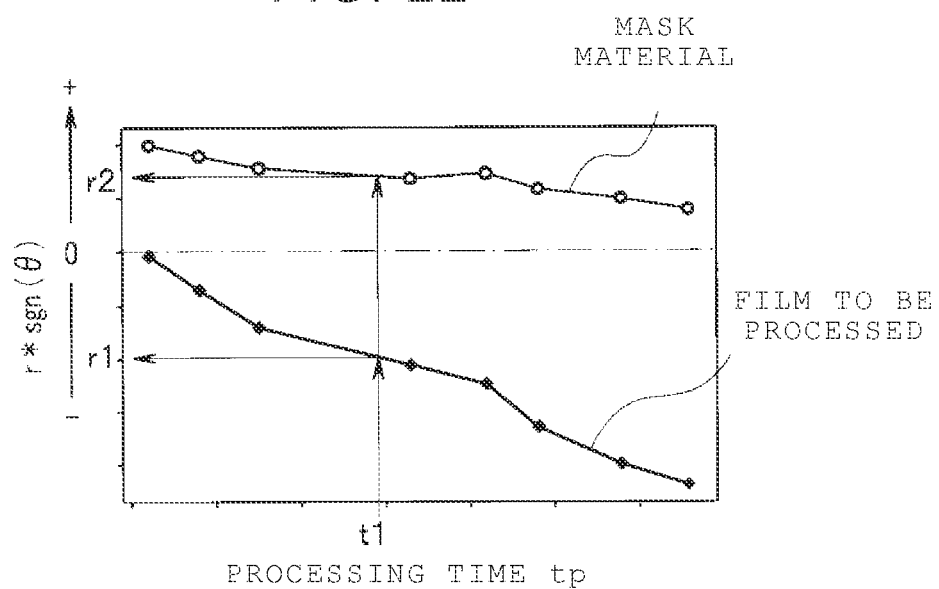
FIG. 22 is a diagram illustrating an example of a relationship between a processed hole distance and a processing time.

FIG. 22 is a diagram illustrating an example of a relationship between a processed hole distance r and a processing time. In FIG. 22, a horizontal axis indicates a processing time tp, and a vertical axis indicates r×sgn (θ). The sgn (θ) is a sign function of θ, and returns 1 when θ>0, 0 when θ=0, and −1 when θ<0. That is, r×sgn (θ)=0 indicates the interface between the mask material and the film to be processed, an area of r×sgn (θ)>0 indicates the mask material, and an area of r×sgn (θ)<0 indicates the film to be processed. In FIG. 22, a white circle plotted in the area of r×sgn (θ)>0 indicates a maximum value of the distance r in the mask material (a distance from a contour of the processed hole on the surface of the mask material to the origin O). A black rhombus plotted in the area of r×sgn (θ)<0 indicates a maximum value of the distance r in the film to be processed (a distance from a contour of the processed hole on the bottom surface of the memory hole to the origin O). That is, it can be said that the white circle represents a relationship between the residual film thickness Tm of the mask material and the processing time tp, and the black rhombus represents a relationship between the depth Th of the memory hole and the processing time tp.

Prior to the measurement, the relationship between the processed hole distance r and the processing time as illustrated in FIG. 22 is acquired, thereby making it possible to estimate the residual film thickness Tm of the mask material and the depth Th of the memory hole according to the processing time of the processed hole to be measured. In consideration of the relationship therebetween of FIG. 22 as an example, when the processing time is t1, it can be estimated that the distance from the contour of the processed hole on the surface of the mask material to the origin O is r2, and the distance from the contour of the processed hole on the bottom surface of the memory hole to the origin O is r1. Therefore, the shape parameter candidate in S14 (the range of values that can be acquired as the shape parameter) can be limited to a value near r2·sin θ for the residual film thickness Tm of the mask material, and limited to a value near r1·sin(−θ) for the depth Th of the memory hole. That is, an amount of calculation of the difference between the measured value and the theoretical value can be reduced, such that measurement cost can be reduced.

In the procedure of forming the memory hole illustrated in FIG. 8, when performing step trace measurement in which the processed shape is measured stepwise (in time series) while performing the etching, and when applying the measurement method of the embodiment to the measurement of the processed shape (S6), the following method may also be applied as a method for estimating the set of the theoretical values for performing the difference calculation with the measured value in S14 of FIG. 14A and limiting the range.

Figure 23:
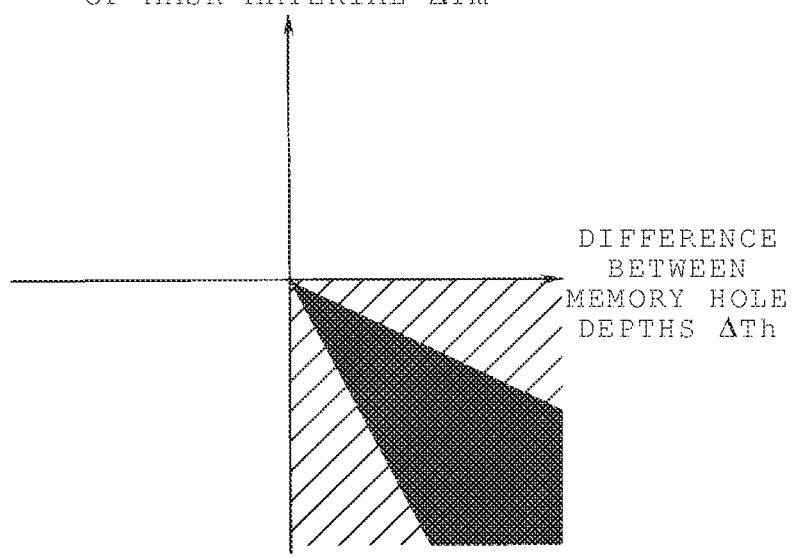
FIG. 23 is a diagram illustrating a relationship between a difference between residual film thicknesses of a mask material and a difference between depths of a memory hole.

FIG. 23 is a diagram illustrating a relationship between a difference between the residual film thicknesses of the mask material and a difference between the depths of the memory hole. A vertical axis of FIG. 23 is a difference between the residual film thicknesses of the mask material (a value obtained by subtracting the residual film thickness of the mask material estimated in the previous measurement from the residual film thickness of the mask material in the measurement target this time). A horizontal axis is a difference between the memory holes (a value obtained by subtracting the depth of the memory hole estimated in the previous measurement from the depth of the memory hole in the measurement target this time). When the etching of the mask material and the film to be processed is continuously performed, the residual film thickness of the mask material decreases and the depth of the memory hole increases as the processing time increases. That is, the two shape parameters this time can be limited to those existing in an area where the horizontal axis is positive and the vertical axis is negative (an area indicated by a diagonal line in FIG. 23) in the drawing of FIG. 23. When an etching rate of the mask material and the film to be processed can be estimated based on the analysis of the measurement result and known knowledge, the existing area of the shape parameter can be further limited. For example, in FIG. 23, the shape parameter can be limited to an area indicated by a black grid.

That is, when the processed shape is measured several times while etching is continuously performed, the range of values that can be acquired as the shape parameter this time can be limited by using the previous measurement result (the residual film thickness of the mask material, the depth of the memory hole). That is, the shape parameter can be estimated more accurately by eliminating an apparently incorrect value. The amount of calculation of the difference between the measured value and the theoretical value can be reduced, such that the measurement cost can be reduced.

As described above, according to the measurement method of the embodiment, the number of shape parameters representing the shape of the deep hole to be measured can be further reduced. The existing range of the values of the shape parameter can be estimated by using the known measurement result and the etching rate. Accordingly, the shape to be measured can be modeled with high accuracy while the measurement cost is reduced.

Third Embodiment

Next, a third embodiment will be described. In a measurement method of the third embodiment, the method of the dimensional compression of the shape parameter is different from that of the first and second embodiments described above. Since the configuration of the measurement device and the structure of the subject 7 to be measured are the same as those of the first embodiment described above, the description thereof will be omitted. Hereinafter, only a point different from that of the first and second embodiments will be described.

In the first embodiment described above, the feature data is extracted from the known shape, the main components are decomposed, and the specific value is estimated for the degree of contribution of each main component to the processed shape (the shape parameter), thereby representing the shape of the processed hole. On the other hand, in the third embodiment, the shape is represented by a process simulation.

Generally, when an etching process simulator inputs a parameter related to a device, a parameter related to a processing condition, and a parameter related to a workpiece to be processed, the shape of the processed hole to be generated is output. As the parameter related to the processing condition, an example thereof includes 20 to 30 types of parameters such as a processing time, an etching gas pressure, an etching gas flow rate (each gas flow rate when a plurality of etching gases are used), RF power, or the like. That is, when a set value of the parameter related to the device and a set value of the parameter related to the workpiece to be processed are known (fixed), various processed shapes can be obtained by changing the value of the parameter related to the processing condition.

The measurement method of the third embodiment is different from that of the first and second embodiments described above in that in S11 of FIG. 14A (the dimensional compression of the shape parameter), the above-described parameter related to the processing condition is used as the shape parameter. All the parameters related to the processing condition are not used as the shape parameters, and a parameter that particularly affects the processed shape may be extracted and used as the shape parameter. For example, when 30 types of parameters related to the processing condition are set, 5 parameters may be extracted therefrom and used as the shape parameters.

In S12 (the database generation of the theoretical scattering intensity), the etching process simulator is used when estimating the shape of the processed hole generated when the shape parameter is changed, which is also a point different from that of the first and second embodiments described above. In the embodiment, a shape used for the theoretical calculation in S17 is also a shape obtained by inputting the shape parameter value candidate set calculated in S16 into the etching process simulator.

As described above, according to the measurement method of the embodiment, the number of shape parameters representing the shape of the deep hole to be measured can be reduced in comparison with the comparative example. The parameter related to the etching process condition is used as the shape parameter and the processed shape is estimated by the etching process simulator, such that a physically desirable shape can be estimated. A search range of the value of the shape parameter can also be limited to a range that can be executed as the etching process, such that the shape to be measured can be modeled with high accuracy while the measurement cost is reduced.

In the procedure of forming the memory hole illustrated in FIG. 8, when performing the step trace measurement in which the processed shape is measured stepwise (in time series) while the etching is performed, and when applying the measurement method of the embodiment to the measurement of the processed shape (S6), a high dimensional compression effect can be obtained. For example, when measuring the shapes of the four processed holes corresponding to steps 3, 4, 5, and 6 in FIG. 7, it is required to calculate the value of the shape parameter for each of the four processed holes according to the comparative example. For example, when 100 pieces of shape parameters are required to represent the shape of one processed hole, it is required to calculate 100×4=400 pieces of values in order to represent the shapes of the above-described four processed holes. On the other hand, in the embodiment, the values of the process parameters other than the processing time are basically not changed in the four steps. That is, the values of the shape parameters other than the processing time can use the values calculated by the measurement of the processed hole in step 3. For example, when the number of shape parameters required to represent the shape of one processed hole is 30, 30+3=33 pieces of values may be calculated in order to represent the shapes of the above-described four processed holes. As described above, the measurement method of the embodiment can further reduce the measurement cost by allowing the known fact that a value of a specific process parameter does not change as in the step trace measurement to be used for the measurement of a plurality of processed holes.

Fourth Embodiment

Next, a fourth embodiment will be described. A measurement method of the fourth embodiment is different from that of the first to third embodiments described above in that a plurality of different shape parameter sets are used. The shape parameter set indicates a set of a plurality of shape parameters used to represent the shape of the processed hole. Since the configuration of the measurement device and the structure of the subject 7 to be measured are the same as those of the first embodiment described above, the description thereof will be omitted. Hereinafter, only a point different from that of the first to third embodiments will be described.

Figure 24:
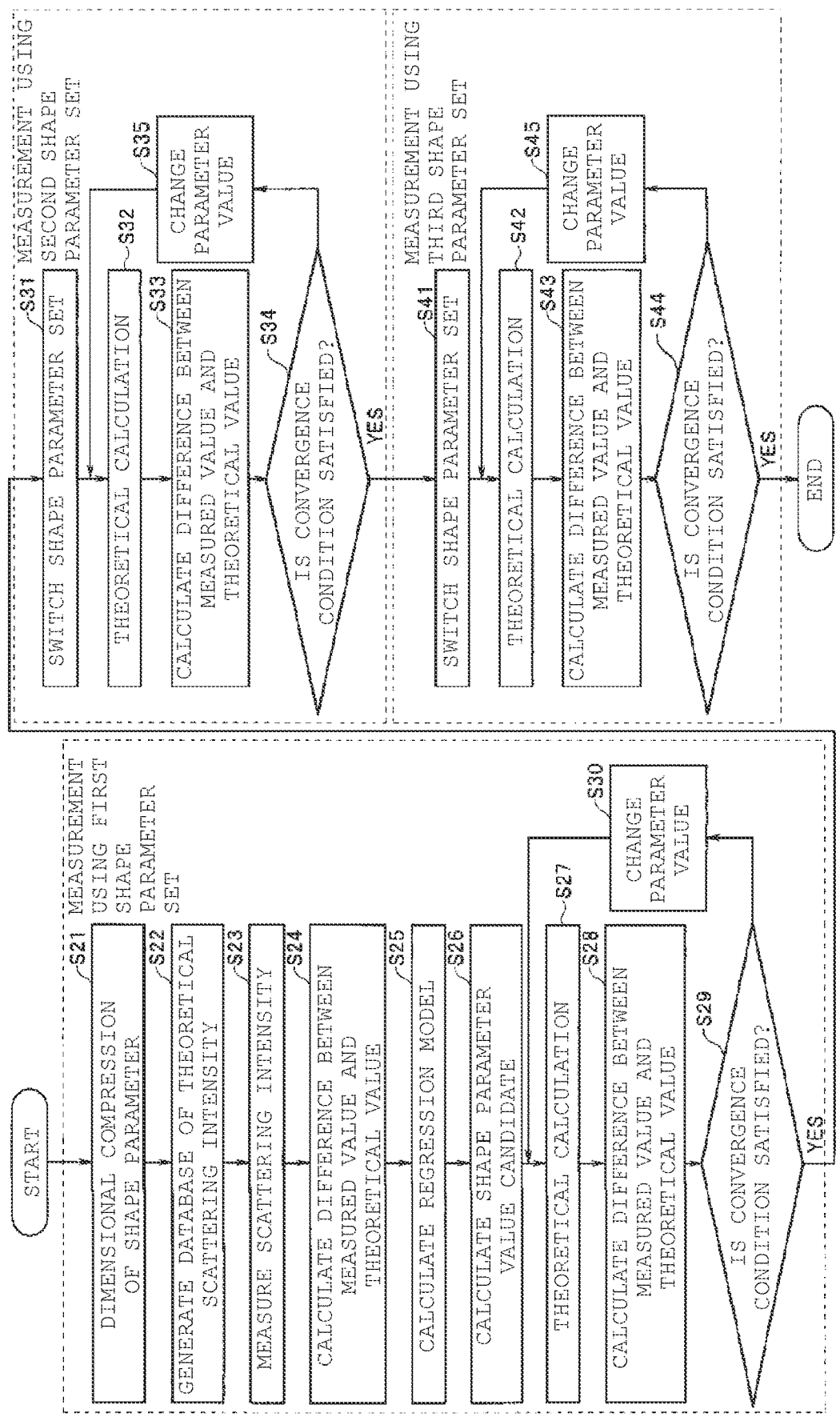
FIG. 24 is a flowchart illustrating an example of a measurement method according to a fourth embodiment.

In the measurement method of the fourth embodiment, the measurement of the processed shape is performed a plurality of times by using several different shape parameter sets of the shape parameters such as a shape parameter dimensionally compressed by using the main component analysis, a shape parameter dimensionally compressed by using the polar coordinate conversion, a shape parameter dimensionally compressed by using the process parameter used in the process simulation, and a shape parameter such as the grid parameter used in the comparative example. FIG. 24 is a flowchart illustrating an example of the measurement method according to the fourth embodiment. FIG. 24 illustrates a procedure when the measurement is performed by using three different shape parameter sets. S21 to S30 in FIG. 24 indicate a first-stage measurement procedure using a first shape parameter set, S31 to S35 indicate a second-stage measurement procedure using a second shape parameter set, and S41 to S45 indicate a third-stage measurement procedure using a third shape parameter set.

The first to third shape parameter sets are selected so that the number of shape parameters increases as the stage progresses. For example, the first shape parameter set uses the shape parameters (the number of shape parameters=5) dimensionally compressed by using the process parameter used in the process simulation, the second shape parameter set uses the shape parameters (the number of shape parameters=10) dimensionally compressed by the main component analysis, and the third shape parameter set uses the grid parameters (the number of shape parameters=100).

The procedures in the first stage, that is, S21 to S30 in FIG. 24 are the same as the measurement procedure illustrated in FIG. 14A. By executing S21 to S30, the shape of the processed hole measured by using the first shape parameter set is output. Next, in the second stage, first, the shape parameter set is switched (S31). Specifically, the shape parameter used in the procedure after S32 is switched from the first shape parameter set to the second shape parameter set. When a regression model corresponding to the shape parameter set used in the second stage is not generated, a regression model that estimates the difference between the theoretical scattering intensity and the measured value for the value of the shape parameter is generated.

Next, the scattering intensity of X-rays is theoretically calculated for the processed shape output as a measurement result of the first stage, and a diffraction image group is acquired (S32). The theoretical value calculated in S32 is compared with the measured value acquired in S23, and a difference therebetween is calculated (S33). Next, a calculation point in the difference estimation curve is added by using the calculated difference, and the regression model is updated. It is determined whether the shape parameter value candidate is a value that minimizes the difference according to a predetermined convergence condition (S34), and when the convergence condition is not satisfied (S34, NO), the value of the shape parameter candidate is changed by using the optimization algorithm for obtaining the minimum value (S35), and S32 to S35 are repeatedly performed while the value of the shape parameter candidate is changed. When the predetermined convergence condition is satisfied (S34, YES), a shape represented by using the value of the shape parameter candidate at that time as the value of the shape parameter is output as a measurement result by the second shape parameter set. That is, S32 to S35 are the same procedures as those of S17 to S20 in FIG. 14A.

In the third stage, first, the shape parameter set is switched (S41). Specifically, the shape parameter used in the procedure after S42 is switched from the second shape parameter set to the third shape parameter set. When a regression model corresponding to the shape parameter set used in the third stage is not generated, a regression model that estimates the difference between the theoretical scattering intensity and the measured value for the value of the shape parameter is generated.

Next, the scattering intensity of X-rays is theoretically calculated for the processed shape output as the measurement result in the second stage, and a diffraction image group is acquired (S42). The theoretical value calculated in S42 is compared with the measured value acquired in S23, and a difference therebetween is calculated (S43). Next, a calculation point in the difference estimation curve is added by using the calculated difference, and the regression model is updated. It is determined whether the shape parameter value candidate is a value that minimizes the difference according to a predetermined convergence condition (S44), and when the convergence condition is not satisfied (S44, NO), the value of the shape parameter candidate is changed by using the optimization algorithm for obtaining the minimum value (S45), and S42 to S45 are repeatedly performed while the value of the shape parameter candidate is changed. When the predetermined convergence condition is satisfied (S44, YES), a shape represented by using the value of the shape parameter candidate at that time as the value of the shape parameter is output as a final measurement result. That is, S42 to S45 are the same procedures as those of S17 to S20 in FIG. 14A.

Figure 25:
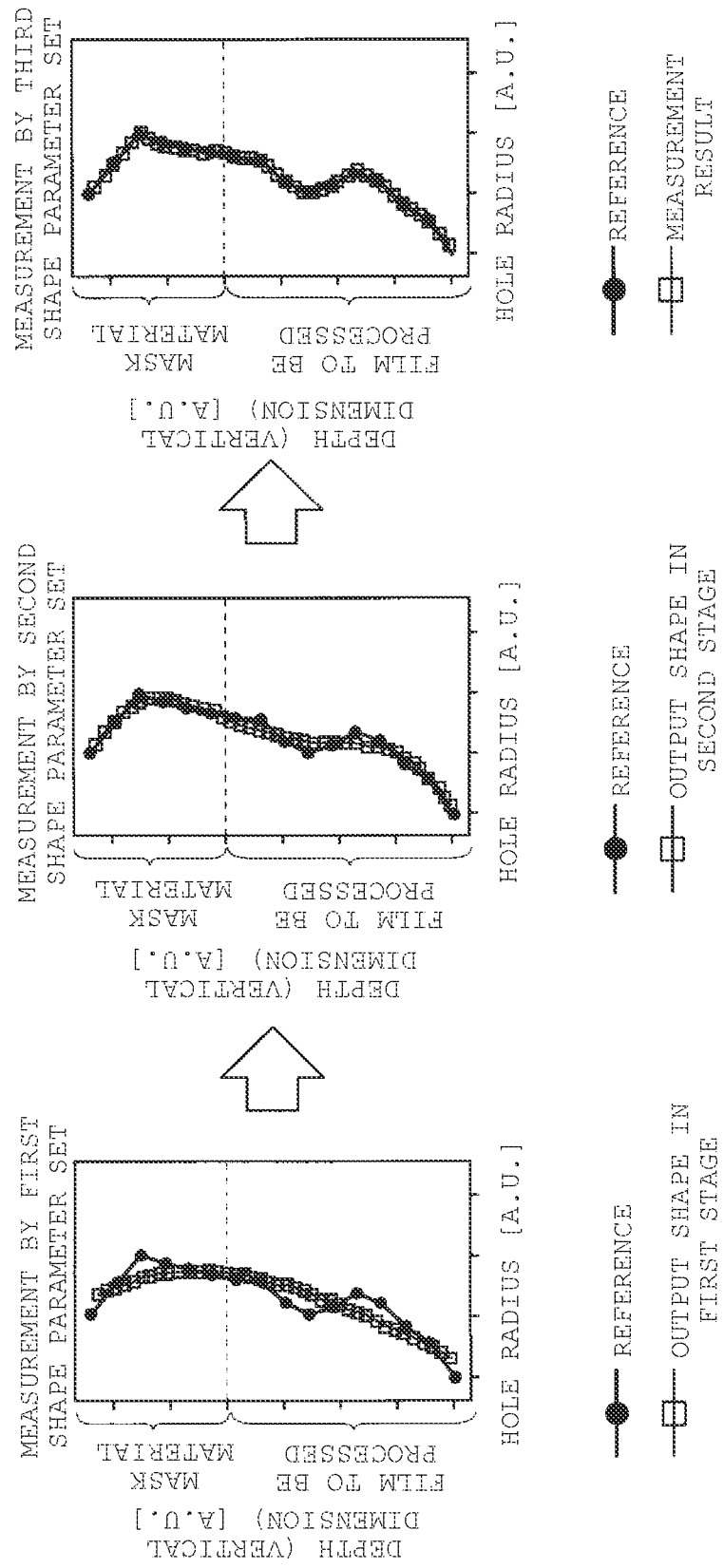
FIG. 25 is a diagram illustrating an example of a measurement result by the measurement method according to the fourth embodiment.

FIG. 25 is a diagram illustrating an example of a measurement result by the measurement method of the fourth embodiment. Three drawings illustrated in FIG. 25 show that a drawing on the left side shows a measurement result at the end of the first stage, a drawing in the center shows a measurement result at the end of the second stage, and a drawing on the right side shows a measurement result at the end of the third stage. In each drawing, a curve connecting black circles shows an actual processed shape (reference), and a curve connecting white squares shows an output shape at each stage. As illustrated in FIG. 25, as the stage progresses, a difference between a shape obtained as a result of measurement and an actual shape becomes smaller. In this manner, a plurality of shape parameter sets are used and sequentially fitted from the shape parameter having the smallest number of dimensions, thereby making it possible to perform global analysis and further improve measurement accuracy.

In the above description, while an example of performing the three-stage measurement using three different shape parameter sets is described, the measurement may be performed with a plurality of stages, the measurement may be performed with two stages, or the measurement may be performed with four or more stages. It is not required to use different dimensional compression methods in each stage. For example, in both the first stage and the second stage, the shape parameter dimensionally compressed by the main component analysis may be used. In this case, the number of shape parameters used in the second stage is set to be greater than the number of shape parameters used in the first stage.

Fifth Embodiment

Next, a fifth embodiment will be described. A measurement method of the fifth embodiment is performed according to a flowchart illustrated in FIG. 14B. FIG. 14B is a flowchart illustrating another example of the measurement method in the embodiment. The measurement method of the fifth embodiment is different from the measurement method of the first embodiment (FIG. 14A) in that a rank is used instead of the regression model and a different calculation method of the shape parameter value candidate is used. Since the configuration of the measurement device and the structure of the subject 7 to be measured are the same as those of the first embodiment described above, the description thereof will be omitted. Hereinafter, only a point different from that of the first embodiment will be described.

In the first embodiment described above, the regression model is calculated from a calculation value of the difference between the measured value and the theoretical value. On the other hand, in the embodiment, the rank is calculated for each shape parameter from the calculation value of the difference therebetween (S25). A specific method for calculating the rank in S25 will be described with a case in which two types of differences f1 and f2 are used as illustrated in FIG. 16B. FIG. 26 is a diagram illustrating rank calculation. Since both f1 and f2 are differences, it is desirable that both are small. However, since the calculation is performed from different weighting coefficients, f2 becomes larger even though f1 is small as illustrated in FIG. 26. In order to select a parameter candidate value that reduces both f1 and f2 in a well-balanced manner, it is desirable to select data shown on a dotted line in FIG. 26. Therefore, the rank is calculated to evaluate the data quantitatively.

Here, a concept referred to as "being superior" is introduced. When data Tn of T1 to T6 exist as illustrated in FIG. 26, and when there is a Tx' having a small difference $f_j$ (f1, f2) for a certain Tx, the Tx is considered to "be superior" to the Tx'. For all the data Tn, when the number of data superior to itself is set to s, a rank r is calculated as s+1. For example, all the data in which the differences f1 and f2 are small with respect to T1 in FIG. 26 exists in an area A. Since T2 exists in the area A, the rank r is 1+1=2. On the other hand, with respect to T2, since there is no data in an area B, the rank r is 0+1=1. In this manner, the rank can be calculated for all the data. Here, while a case of using two types of differences is described, the rank can be calculated in the same manner when there are one or more types of differences. Next, in S26, the candidate of the shape parameter value is calculated by extracting a set of shape parameter values corresponding to the number of candidates determined in advance from the one having the smallest rank. The procedures of S21 to S24 are the same as the procedures of S11 to S14 in FIG. 14A. The procedures of S27 to S30 are the same as the procedures of S17 to S20 in FIG. 14A.

According to the fifth embodiment, when there are a plurality of types of differences, it is possible to inspect the parameter candidate value that reduces all the difference values in a well-balanced manner. Since the rank calculation requires a small amount of calculation, calculation can be performed in a shorter calculation time than the calculation of the regression model of the first embodiment. Therefore, it can be seen that the embodiment is also advantageous when the calculation time is desired to be shortened.

As described above, according to the measurement device and the measurement method of the embodiment, a three-dimensional shape of a deep hole having a complicated cross-sectional shape can be modeled with high accuracy while the number of parameters is reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A measurement device, comprising:
   an X-ray irradiator configured to irradiate a subject with X-rays;
   an X-ray detector including a semiconductor detection element, the X-ray detector being configured to detect X-rays scattered from the subject and convert the detected X-rays into an imaging signal indicating a diffraction signal;
   a storage;
   a camera;
   a controller; and
   an analyzer including a hardware processor that includes an electronic circuit, the analyzer being configured to, as a preparation phase:
   set, using the hardware processor, feature data to previously-known shape information such that the set feature data includes a plurality of items, and determine initial values of shape parameters for respective items of the set feature data, for representing a surface contour shape of the subject;

calculate, using the hardware processor, theoretical scattering intensities and store the theoretical scattering intensities into the storage while changing the shape parameters; and wherein the analyzer is further configured to, as a measurement phase:
measure, using the X-ray irradiator and the X-ray detector, a scattering intensity of an measurement area of the subject;
calculate, using the hardware processor, a difference between the measured scattering intensity and each of the stored theoretical scattering intensities, and generate a regression model of a relationship between the measured scattering intensity and each of the stored theoretical scattering intensities;
extract, using the hardware processor, a part of the stored theoretical scattering intensities each of which has the difference with respect to the measured scattering intensity, the extracted part of the stored theoretical scattering intensities being shape parameter candidates;
update, using the hardware processor, the regression model to add interpolation points from the extracted part of the stored theoretical scattering intensities; and
estimate, using the hardware processor, the shape parameters based on the updated regression model, wherein
the camera is configured to detect a deviation amount between an irradiation location of x-rays irradiated by the X-ray irradiator and a measurement target location in the subject, and output the deviation amount to the controller, and
based on the deviation amount, the controller is configured to control the X-ray irradiator to irradiate the measurement target location in the subject with X-rays.

2. The measurement device according to claim 1, wherein the regression model is recalculated based on the difference each time the shape parameter candidates are changed.

3. The measurement device according to claim 1, wherein a first film and a second film formed of respectively different materials are stacked in the measurement area of the subject, and a hole portion penetrating the second film is formed in the measurement area, and
the analyzer is configured to determine the shape parameters based on a conversion in which a center of the hole portion at an interface between the first film and the second film is defined as an origin of a polar coordinate.

4. The measurement device according to claim 1, wherein a first film and a second film formed of respectively different materials are stacked in the measurement area, and a hole portion penetrating the second film is formed in the measurement area, and
the analyzer is configured to select the shape parameters from process parameters set in an etching process to form the hole portion.

5. The measurement device according to claim 4, wherein the previously-known shape information is a result of a plurality of process simulations in which the process parameters are changed.

6. The measurement device according to claim 4, wherein the analyzer is configured to limit a search range of a value of the shape parameters based on the etching process.

7. The measurement device according to claim 1, wherein the analyzer is configured to store a plurality of types of sets of the shape parameters, and estimate values of the shape parameters while sequentially switching the sets of the shape parameters to each other.

8. The measurement device according to claim 7, wherein each of the plurality of sets of shape parameters is formed of a different number of shape parameters, and the values of the shape parameters are estimated sequentially from a set of the shape parameters having a smallest number of shape parameters.

9. The measurement device according to claim 1, wherein the feature data includes a first component having a linear shape, a second component having a shape bent in one direction, and a third component having a shape bent in another direction.

10. A measurement device, comprising:
an X-ray irradiator configured to irradiate a subject with X-rays;
an X-ray detector including a semiconductor detection element, the X-ray detecting being configured to detect X-rays scattered from the subject and convert the detected X-rays into an imaging signal indicating a diffraction signal;
storage;
a camera;
a controller; and
an analyzer including a hardware processor that includes an electronic circuit, the analyzer being configured to:
set, using the hardware processor, feature data to previously-known shape information such that the set feature data includes a plurality of items, and determine initial values of shape parameters for respective items of the set feature data, for representing a surface contour shape of the subject;
calculate, using the hardware processor, theoretical scattering intensities and store the theoretical scattering intensities into the storage while changing the shape parameters;
measure, using the X-ray irradiator and the X-ray detector, a scattering intensity of an measurement area of the subject;
calculate, using the hardware processor, a rank for each of the shape parameters from a value of a difference between the measured scattering intensity and each of the stored theoretical scattering intensities; and
extract, using the hardware processor, at least one shape parameter candidate in an ascending order of respective values of the ranks, wherein
the camera is configured to detect a deviation amount between an irradiation location of x-rays irradiated by the X-ray irradiator and a measurement target location in the subject, and output the deviation amount to the controller, and
based on the deviation amount, the controller is configured to control the X-ray irradiator to irradiate the measurement target location in the subject with X-rays.

11. The measurement device according to claim 10, wherein the feature data includes a first component having a linear shape, a second component having a shape bent in one direction, and a third component having a shape bent in another direction.

12. A measurement method, comprising:
irradiating, by an X-ray irradiator, a subject with X-rays;
detecting, by an X-ray detector including a semiconductor detection element, X-rays scattered from the subject and converting the detected X-rays into an imaging signal indicating a diffraction signal;

during a preparation phase, setting, using a hardware processor including an electronic circuit, feature data to previously-known shape information such that the set feature data includes a plurality of items, and determine initial values of shape parameters for respective items of the set feature data, for representing a surface contour shape of the subject; and calculating, using the hardware processor, theoretical scattering intensities and store the theoretical scattering intensities into the storage while changing shape parameters;

during a measurement phase, measuring, using the X-ray irradiator and the X-ray detector, a scattering intensity of an measurement area of the subject;

calculating, using the hardware processor, a difference between the measured scattering intensity and each of the stored theoretical scattering intensities, and generate a regression model of a relationship between the measured scattering intensity and each of the stored theoretical scattering intensities;

extracting, using the hardware processor, a part of the stored theoretical scattering intensities each of which has the difference with respect to the measured scattering intensity, the extracted part of the stored theoretical scattering intensities being shape parameter candidates;

updating, using the hardware processor, the regression model to add interpolation points from the extracted part of the stored theoretical scattering intensities; and estimating, using the hardware processor, shape parameters based on the updated regression model;

detecting, by a camera, a deviation amount between an irradiation location of x-rays irradiated by the X-ray irradiator and a measurement target location in the subject, and outputting, by the camera, the deviation amount to the controller, and based on the deviation amount, controlling, by the controller, the X-ray irradiator to irradiate the measurement target location in the subject with X-rays.

13. The measurement method according to claim 12, further comprising:

recalculating the regression model based on the difference each time the shape parameter candidates are changed.

14. The measurement method according to claim 12, further comprising:

determining the shape parameters based on a conversion in which a center of a hole portion at an interface between a first film and a second film is defined as an origin of a polar coordinate, wherein the first film and the second film formed of respectively different materials are stacked in the measurement area of the subject, and the hole portion penetrating the second film is formed in the measurement area.

15. The measurement method according to claim 12, further comprising:

selecting the shape parameters from process parameters set in an etching process to form a hole portion, wherein a first film and a second film formed of respectively different materials are stacked in the measurement area, and the hole portion penetrating the second film is formed in the measurement area.

16. The measurement method according to claim 15, further comprising:

limiting a search range of a value of the shape parameters based on the etching process.

17. The measurement method according to claim 15, further comprising:

storing a plurality of types of sets of the shape parameters, and estimating values of the shape parameters while sequentially switching the sets of the shape parameters to each other.

18. The measurement method according to claim 17, wherein each of the plurality of sets of shape parameters is formed of a different number of shape parameters, and the values of the shape parameters are estimated sequentially from the set of the shape parameters having a smallest number of shape parameters.

19. The measurement method according to claim 12, wherein the feature data includes a first component having a linear shape, a second component having a shape bent in one direction, and a third component having a shape bent in another direction.

* * * * *